(12) United States Patent
Sodhani et al.

(10) Patent No.: US 10,423,828 B2
(45) Date of Patent: Sep. 24, 2019

(54) USING DEEP LEARNING TECHNIQUES TO DETERMINE THE CONTEXTUAL READING ORDER IN A FORM DOCUMENT

(71) Applicant: Adobe Inc., San Jose, CA (US)

(72) Inventors: Shagun Sodhani, Delhi (IN); Kartikay Garg, New Delhi (IN); Balaji Krishnamurthy, Noida (IN)

(73) Assignee: Adobe Inc., San Jose, CA (US)

( * ) Notice: Subject to any disclaimer, the term of this patent is extended or adjusted under 35 U.S.C. 154(b) by 76 days.

(21) Appl. No.: 15/843,953

(22) Filed: Dec. 15, 2017

(65) Prior Publication Data
US 2019/0188463 A1 Jun. 20, 2019

(51) Int. Cl.
G06K 9/62 (2006.01)
G06K 9/00 (2006.01)

(52) U.S. Cl.
CPC ..... *G06K 9/00456* (2013.01); *G06K 9/00463* (2013.01); *G06K 9/6262* (2013.01); *G06K 2209/01* (2013.01)

(58) Field of Classification Search
CPC .......... G06K 9/00456; G06K 9/00463; G06F 16/93; G06F 17/2705; G06F 17/21
USPC ......... 382/157, 182, 173, 321; 358/488, 452
See application file for complete search history.

(56) References Cited

U.S. PATENT DOCUMENTS

| 2007/0116363 | A1* | 5/2007 | Iida ................... G06K 9/2054 382/182 |
| 2007/0229920 | A1* | 10/2007 | Fukushima ........ H04N 1/00795 358/488 |
| 2017/0286401 | A1* | 10/2017 | He .......................... G06F 17/16 |
| 2018/0143760 | A1* | 5/2018 | Orr ...................... G06F 3/04886 |
| 2019/0005322 | A1* | 1/2019 | Tripathi .............. G06F 17/2264 |

OTHER PUBLICATIONS

"Welcome to Wikipedia", retrieved from the Internet: https://en.wikipedia.org/wiki/Main_Page [retrieved Mar. 16, 2018], 3 pages.
"Reddit, the front page of the internet", retrieved from the Internet: https://www.reddit.com/ [retrieved Mar. 16, 2018] 3 pages.
"Andrej Karpathy Blog, Hacker's guide to Neural Networks", retrieved from Internet: http://karpathy.github.io/2015/05/21/rnn-effectiveness/ [retrieved Mar. 16, 2018] 31 pages.

(Continued)

*Primary Examiner* — Charlotte M Baker
(74) *Attorney, Agent, or Firm* — Finch & Maloney PLLC

(57) ABSTRACT

Techniques for determining reading order in a document. A current labeled text run (R1), RIGHT text run (R1) and DOWN text run (R3) are generated. The R1 labeled text run is processed by a first LSTM, the R2 labeled text run is processed by a second LSTM, and the R3 labeled text run is processed by a third LSTM, wherein each of the LSTMs generates a respective internal representation (R1', R2' and R3'). Deep learning tools other than LSTMs can be used, as will be appreciated. The respective internal representations R1', R2' and R3' are concatenated or otherwise combined into a vector or tensor representation and provided to a classifier network that generates a predicted label for a next text run as RIGHT, DOWN or EOS in the reading order of the document.

20 Claims, 17 Drawing Sheets

(56) References Cited

OTHER PUBLICATIONS

"Christopher Olah's Blog, Understanding LSTM Networks", retrieved from the Internet: http://colah.github.io/posts/2015-08-Understanding-LSTMs/ [retrieved Mar. 16, 2018] 9 pages.

"IBM Datacap, Document capture for the cognitive era", retrieved from the Internet: https://www.ibm.com/bs-en/marketplace/data-capture-and-imaging [retrieved Mar. 16, 2018] 6 page.

"IBM Datacap Mobile Product Demo", retrieved from the Internet: https://www.youtube.com/watch?v=TMwAam0TMkQ [retrieved Mar. 16, 2018] 2 pages.

"IBM Datacap Insight Edition", IBM Hybrid Cloud, Solution Brief, [retrieved Mar. 16, 2018] 4 pages.

* cited by examiner

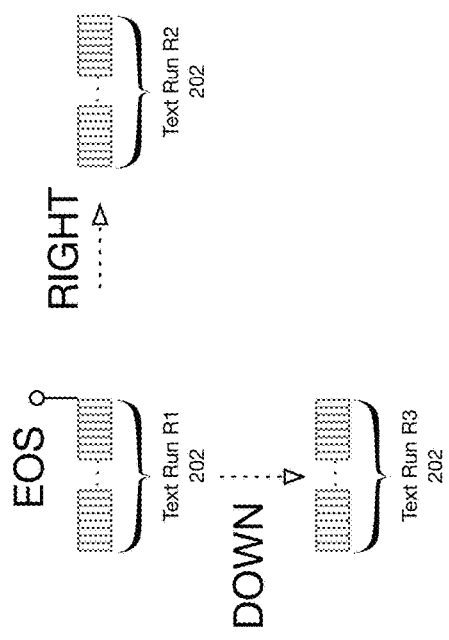
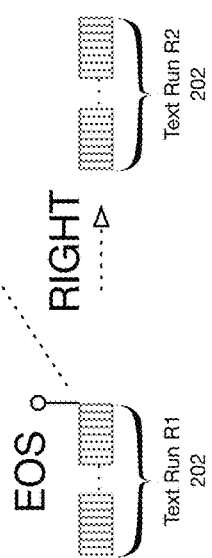
FIG. 2c
FIG. 2d

Breakdown of Sales Amounts for Reporting Month

$ .................... $ .................... $ .................... $ ....................
Vessel and Outboard Motor Inventory    Fleet Transactions    Dealer Sales    Subsequent Sales STEP 5: Signature — 328 print here ▶ _____ _____
Print Name                                                                                    Title sign here ▶ _____ _____
Authorized Signature                                                                       Date If you make a false statement on this report, you could be found guilty of a Class A misdemeanor or a state jail felony under Penal Code Section 37.10.

Additional Instructions

1. Type of Sale: Place one of the following codes by each sale reported:

VM – vessel and outboard motor inventory – the sale of watercraft used or capable of being used for transportation on water that is not more than 65 feet in length (vessels) and the sale of self-contained internal combustion propulsion systems which are used to propel vessels and which are detachable as a unit from the vessel (outboard motors). The term "vessel" also includes a vehicle that is designed to carry watercraft and is either a "trailer" or "semitrailer" as defined by Transportation Code Section 501.002(23) and (29). The term "vessel" does not include watercraft of more than 65 feet in length; or a seaplane on water; or canoes, kayaks, punts, rowboats, rubber rafts, or other vessels under 14 feet in length when paddled, poled, oared, or windblown. This category does not include a fleet transaction, dealer sale, or subsequent sale, each of which is defined below. Only this type of sale has a unit property tax (see below). (See, Tax Code Sections 23.124(a)(8), (14), (15), and Parks and Wildlife Code, Section 31.003.]

FL – fleet transaction – the sale of five or more vessels or outboard motors from a dealer's vessel and outboard motor inventory to the same business entity within one calendar year. [Tax Code Section 23.124(a)(7).]

DL – dealer sale – the sale from a dealer's vessel and outboard motor inventory to another dealer, that is, a person who holds a dealer's and manufacturer's number issued by the Parks and Wildlife Department under the authority of Parks and Wildlife Code Section 31.041, or is authorized by law or interstate reciprocity agreement to purchase vessels or outboard motors in Texas without paying the sales tax. The term does not include the manufacturer of vessels or outboard motors. (See, Tax Code Section 23.124(a)(3).]

SS – subsequent sale – a dealer-financed sale of a vessel or outboard motor that, at the time of the sale, has been the subject of a dealer-financed sale from the same dealer's vessel and outboard motor inventory in the same calendar year. [Tax Code Section 23.124(a)(13).]

2. Sales Price: The price as set forth on the "Application for Texas Certificate of Number/Title, for Boat/Seller, Donor or Trader's Affidavit" for a vessel, the "Application for Texas Certificate of Title for an Outboard Motor/Seller, Donor or Trader's Affidavit" for an outboard motor, or the "Application for Texas Certificate of Title" for a trailer treated as a vessel, or the price that would appear if those forms were used.

3. Unit Property Tax: To compute, multiply the sales price by the unit property tax factor. For fleet, dealer and subsequent sales that are not included in the vessel and outboard motor inventory, the unit property tax is $-0-. Contact either the county tax assessor-collector or county appraisal district for the current unit property tax factor. The unit property tax factor is calculated by dividing the prior year aggregate tax rate by 12. If the aggregate tax rate is expressed in dollars per $100 of valuation, divide by $100 and then divide by 12. It represents one-twelfth of the preceding year's aggregate tax rate at the location. If no unit property tax is assigned, state the reason.

4. Total Unit Property Tax for This Month: Enter the total amount of unit property tax. This is the total amount of unit property tax that will be submitted with the statement to the collector.

FIG. 6

USING DEEP LEARNING TECHNIQUES TO DETERMINE THE CONTEXTUAL READING ORDER IN A FORM DOCUMENT

FIELD OF THE DISCLOSURE

This disclosure relates to techniques for processing documents. In more detail, this disclosure relates to techniques for determining the reading order of documents.

BACKGROUND

The common use case of digitizing a paper document or form and converting it into an adaptive or reflowable document presents many challenges. Simply scanning a document will not be sufficient as it will only provide an "image" version of the document and further processing would be required to perform tasks like structure extraction and text extraction. For the particular case of text extraction, the simplest approach is to perform an Optical Character Recognition ("OCR") process on the scanned document and store the recognized textual content.

However, this simple approach has several significant shortcomings. In particular, a general document comprises sentences, paragraphs, headings, images, tables and other elements arranged arbitrarily over a number of rows and columns. Thus, a natural problem that arises in parsing scanned documents is determining the correct reading order of the document. That is, while reading a document, a human reader can naturally infer the correct reading order in the document as a human reader recognizes the context of the document, which allows the human reader to infer the next direction of the reading order based upon the current point to which the reader has read the document. However, a computing device is not naturally adapted to this type of inference to allow it to determine the correct reading order of a document. As documents are typically arranged in multiple columns and rows, the reading order of a document is not obvious and extracting the reading order of a document is certainly not easily codified as a set of rules to be performed by a computing device. For example, an OCR system cannot determine the correct reading order of a document. Rather, it needs some intelligence to understand the correct reading order of the document so that the correct reading context can be maintained even in the digital version.

One of the specific instances of parsing scanned documents is parsing paper forms and then converting them to digital forms. Reading order is important because a critical aspect in creating a reflowable document from a scanned document is maintaining the reading order of text amongst the various parts in the document and the same applies for a paper form. Conventional approaches attempt to solve this problem through the use of visual modalities which means that they only process a form as an image. While doing so, they do not explicitly take into account the text written in the form and thus drop the essential information required to maintain the context of the form, making it impossible to maintain the correct reading order in the form while parsing it. As a result, conventional approaches to determine reading order of a document heuristically assume a reading order of left-to-right and top-to-bottom. The heuristic approach breaks down for even simple, common cases where, for example, a document assumes a 2-column layout.

Another approach to maintaining the reading order of text amongst the various parts in the document is to employ an n-gram language model to extract relevant features to feed into a language model. Alternatively, a simple recurrent neural network ("RNN") model may be applied to detect and extract features. However, these approaches have several limitations. First, in determining the correct reading order, it is important to model all the text seen so far in the form contextually. While RNN language based models are known to outperform n-gram models in terms of capturing long term dependencies, language model approaches incur significant limitations. In particular, a word-level model needs the text to be typo-free as otherwise the word level features are not extracted correctly. In particular, when text is extracted using a visual system such as an OCR system, the text extraction itself is not perfect and there are typos in form of missing characters, split words etc. leading to errors in the overall performance of reading order determination.

Thus, there exists a significant and unsolved problem in automatically determining the reading order of a document in a robust manner.

BRIEF DESCRIPTION OF THE DRAWINGS

FIG. 2c illustrates R1, R2, R3 text runs and an EOS according to one embodiment of the present disclosure.

FIG. 2d illustrates an alternative identification of an R3 text run with respect to a current R1 text run according to one embodiment of the present disclosure.

FIG. 6 depicts an example document for which a reading order is to be determined according to one embodiment of the present disclosure.

DETAILED DESCRIPTION

Figure 1:
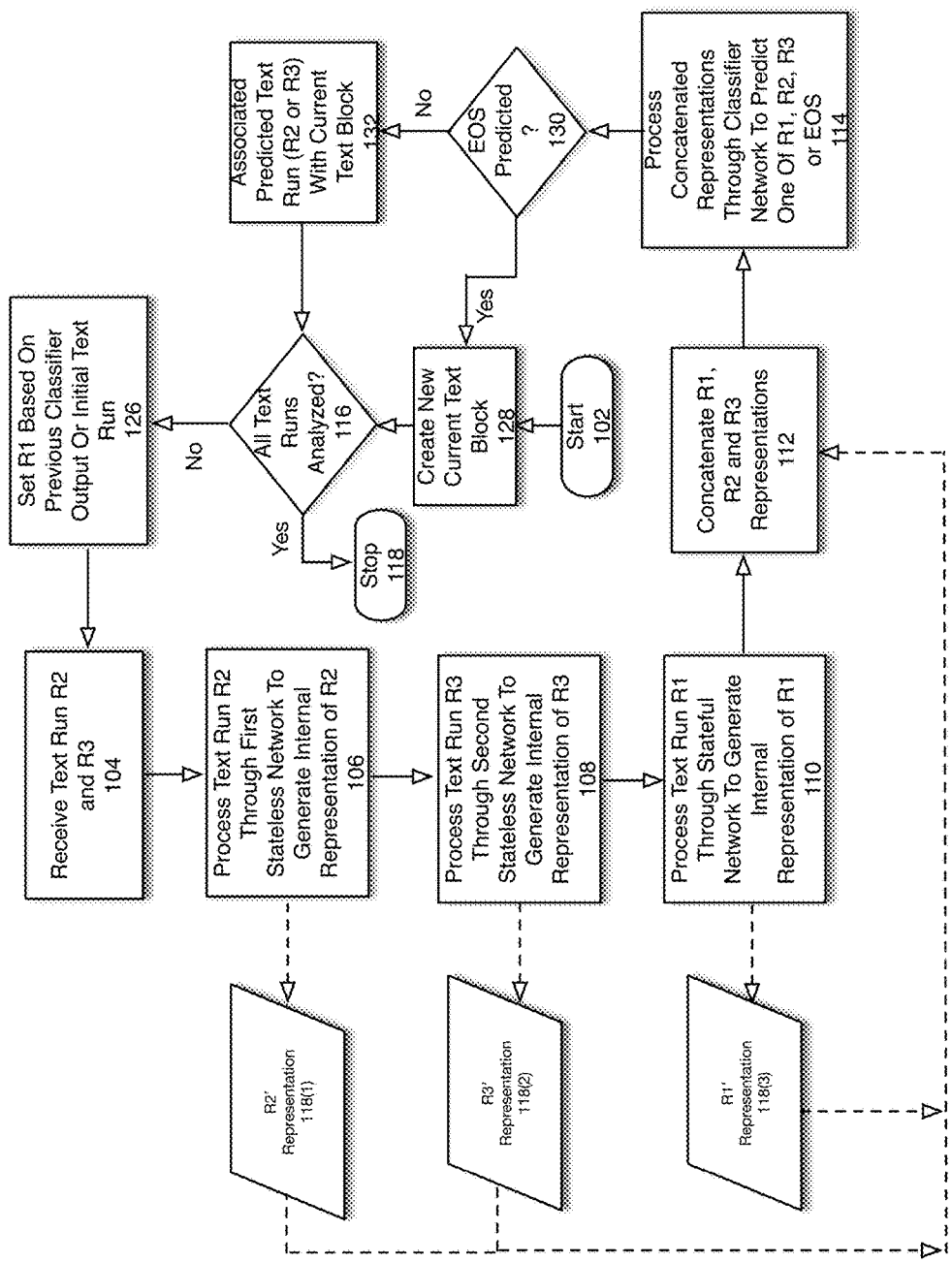
FIG. 1 is a flowchart for a process to determine reading order in a document according to one embodiment of the present disclosure.

The present disclosure describes computer-implemented techniques for determining reading order in a document. For purposes of this disclosure, the term "reading order" refers to the correct sequence of characters defining the natural language order in which a document would be read by a human being.

According to one embodiment of the present disclosure, reading order of a document is determined using a character level model that provides significant improvements in accuracy and robustness over conventional approaches that may employ a word level model. According to some embodiments of the present disclosure, LSTM ("Long Short Term Memory") recurrent neural network ("RNNs") are trained using an underlying character level model that can model long term dependencies. Using a character level model does not require well defined words and thereby avoids many of the shortcomings previously discussed relating to word level models.

According to some embodiments of the present disclosure, a reading order of a document may be determined by associating what are herein referred to as "text runs" with "text blocks." For purposes of the present discussion, the term "text run" comprises a finite sequence of characters. The term "text block" comprises a finite sequence of text runs and may be understood effectively as a sentence. A more detailed description of the terms text run and text block is provided below with respect to FIGS. 2a-2b.

According to some embodiments of the present disclosure, a current context in the reading order of a document is maintained by tracking a current text run referred to as the R1 text run. The text run immediately to the right of the R1 text run is referred to as the R2 (RIGHT) text run. Similarly, the text run immediately down from R1 text run is referred to as the R3 (DOWN) text run. These text runs may be dynamically labeled as R1, R2 and R3. A special label EOS ("End of Statement") may be used to indicate the end of a text block (i.e., the end of a sentence).

According to one embodiment, these text runs and their labeling as R1, R2 and R3 may be generated via an optical process such as an OCR process and a text run labeling process. Then according to one such embodiment, the R1 labeled text run may be processed by a first RNN (which may be an LSTM according to some embodiments) that was trained using a stateful model (described below) while the R2 and R3 labeled text runs may be processed by a second RNN (which may be an LSTM according to some embodiments) that was trained utilizing a stateless model (discussed below).

Each of the RNNs/LSTMs generates a respective internal representation (R1', R2' and R3'), which may comprise the internal state of the RNN/LSTM, based upon the respective input R1, R2 and R3. Then, according to one particular embodiment, the respective internal representations R1', R2' and R3' are concatenated or otherwise combined into a vector or tensor representation and provided to a classifier network that generates a prediction label for predicting whether the next text run is to the right (RIGHT/R2), down (DOWN/R3) or whether an end of statement (EOS) is predicted in the reading order of the document. These prediction labels may then be utilized by a text block analytics module to group particular text runs into a sequence within a text block and an overall sequence of text blocks, the aggregate of such entities comprising a reading order of the document.

Inference Time Processing

FIG. 1 is a flowchart for a process to determine reading order in a document according to one embodiment of the present disclosure. According to one embodiment of the present disclosure, the process shown in FIG. 1 may be performed by a document reading order processing system, which may include a reading order prediction network, which itself comprises various neural networks (discussed below), at inference time. An example structure of a document reading order processing system is described below. Techniques for training various neural networks such as reading order prediction network associated with the document reading order processing system shown in FIG. 1 are described below. It is assumed for purposes of this discussion that a document is to be analyzed to determine the reading order of textual content in the document.

Briefly, for purposes of the present discussion, it should be understood that a document reading order processing system may receive a sequence of text runs as input (for example from an OCR) and provide as output a reading order for the text runs. As an intermediary operation, the document reading order processing system (discussed below) may provide as output an association between text runs and text blocks. A detailed description of text runs and text blocks as well as associated example data structures is described below. Further, as described briefly above, the labels/variables R1, R2, R3 and EOS refer respectively to a current text run, the text run to the right of the current text run, a text run below the current text run and an end of statement/sentence.

The process is initiated in 102. In 128, a new current text block is created/initialized. In 116, it is determined whether all text runs have been analyzed. If so ('Yes' branch of 116), the process ends in 118. If not ('No' branch of 116), in 126, the variable R1 is set based upon either the text run associated with the previous classifier output, or in the case in which the previous classifier output was EOS or no previous classifier output was generated, the initial text run in the document. In 104, text runs in the document corresponding to R2 and R3 are received. In general, as will become evident below, the text runs corresponding to R1, R2 and R3 may be generated by an OCR system.

In 106, the text run corresponding to R2 is processed through what is referred to herein as a stateless network to generate an internal representation of the R2 text run R2. Details of the example networks and a stateless model are described below. As will become evident below, a stateless network may comprise a RNN/LSTM trained using a stateless character level model wherein the internal state of the network is reset periodically, for example upon processing a batch of characters. For purposes of the present discussion, it should be recognized that the various networks utilized for processing (i.e., RNNs/LSTMs) are capable of maintaining an internal state or internal representation. To further elucidate the term stateless in the context of a stateless character level model, this concept refers to the fact that during a training process, the internal state of the network (RNN/LSTM) may be reset with each training batch or on some other cadence, and thereby the network does not maintain a long-term state. Using a character level model does not require well defined words and thereby avoids many of the shortcomings previously discussed relating to word level models. Thus, for purposes of this discussion the term stateless should be understood in this context, namely that the term stateless refers to a particular methodology for training the network (RNN/LSTM) and not that the network (RNN/LSTM) does not or is incapable of maintaining state information. Details regarding a structure and operation of an LSTM are described below. Thus, in 106, text run R2 is processed through a first stateless network to generate an internal representation of the R2 text run referred to as R2' which according to some embodiments corresponds to an internal state of the first stateless network (RNN/LSTM).

In an analogous fashion, in 108, text run R3 is processed through a second stateless network (RNN/LSTM) to generate an internal representation R3. In 110, text run R1 is processed through a stateful network to generate internal representation R1'. As will become evident below, a stateful network may comprise a RNN/LSTM trained using a stateful character level model wherein the internal state of the network is maintained over batches of characters. However, as described below the stateful network/stateful model may undergo a state reset upon detection of an EOS, which signals the end of a text block. According to one embodiment of the present disclosure, the network utilized for processing of the R1 text run may also be an LSTM. The term stateful in this context refers to the fact that during training contrary to the two stateless networks utilized for processing R2 and R3 text runs, an internal state of the network is not reset and thereby it maintains state information over an arbitrary character sequence. However, the state of the stateful network may be reset at the end of a text block (i.e., upon detection of an EOS).

In 112, the representations of the internal states for the two stateless networks for respectively processing the R2 and R3 text runs (R2' and R3') and the internal state of the stateful network for processing the R1 text run (R1') are concatenated into a concatenated representation (vector or tensor). The internal state representations of R1', R2' and R3' may be arbitrary length vectors/tensors and their general form will be well understood in the context of deep neural network processing. The concatenated representation is hereby referred to as R'=[R1'R2'R3'].

In 114, the concatenated representation R'=[R1'R2'R3'] is processed through a classifier network to predict one of the labels R2, R3 or EOS, which indicates the predicted direction of the next text run in the reading order of the document or an EOS signifying the end of a text block. The structure of an example classifier network will be described below, but it general it may comprise a fully connected deep neural network ("DNN") with a softmax output. The classifier network may generate prediction labels of R2, R3 or EOS indicating a predicted next text run as RIGHT, DOWN or that an EOS is predicted (i.e., end of text block). In 130, if the EOS label is predicted ('Yes' branch of 130), flow continues with 128 a new current text block is generated. This means that the classifier has predicted an end of statement (sentence) and therefore any subsequent text runs should be associated with a new text block. Flow then continues with 116.

If, on the other hand, an EOS is not predicted in 130 ('No' branch of 130), it means that the classifier either predicted one of the R2 or R3 labels. This means that the next text run in the reading order is either RIGHT or DOWN. In this instance, the text run associated respectively with the prediction label (either R2 or R3) is associated with the current text block. Flow then continues with 116 in which it is determined whether all text runs have been analyzed.

Text Run and Text Blocks

Figure 2A:
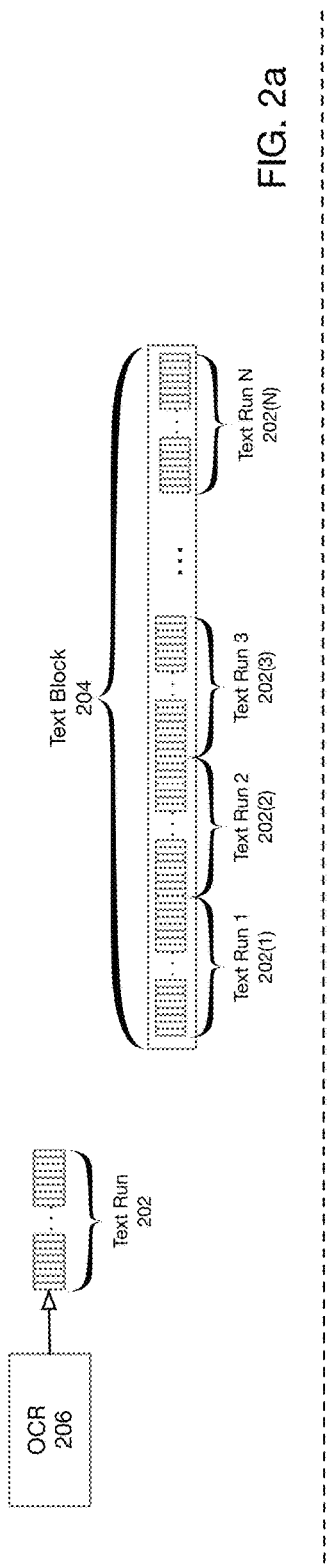
FIG. 2a depicts a text run and text block according to one embodiment of the present disclosure.

FIG. 2a depicts a text run and text block according to one embodiment of the present disclosure. As shown in FIG. 2a, text run 202 may comprise a sequence of characters of arbitrary length, wherein the characters are signified by the blocks shown in FIG. 2a. As will be described below, according to one embodiment of the present disclosure, an OCR system or module 206 or other visual processing algorithm may generate text runs 202 from a document using a visual modality. In particular, according to one embodiment of the present disclosure, text run 202 may comprise an incremental output of an OCR system 206, which is a sequence of characters. The number of characters in the incremental output of OCR system 206 may not be fixed but may be bounded above or below or alternatively may be arbitrary. According to alternative embodiments, a document may already exist in a text-based format and therefore an OCR or other optical system is not required.

Further, as shown in FIG. 2a, text block 204 may comprise a set of text runs 202(1)-202(N) arranged in a particular sequence. According to one embodiment of the present disclosure, a text block 204 may correspond to a sentence. That is, a text block 204 (sentence) may be understood as a sequence of text runs (202(1)-202(N)) in a definite sequential arrangement. According to one embodiment of the present disclosure, the EOS label predicted by a classifier may delineate the end of one text block 204 and the start of another. According to one embodiment of the present disclosure, text block 204 may correspond to a sentence.

Figure 2B:
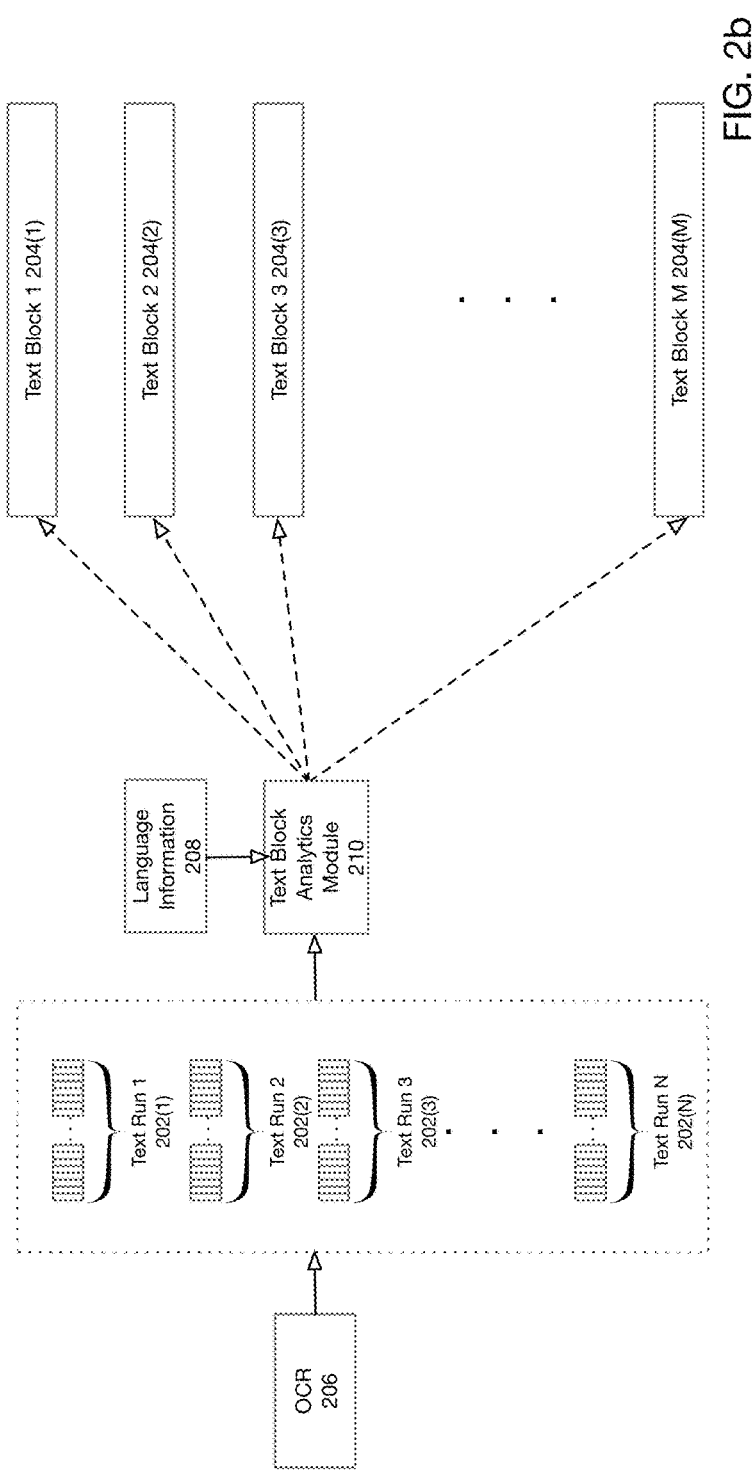
FIG. 2b illustrates an operation of a text block analytics module that may be part of a document reading order processing system according to one embodiment of the present disclosure.

FIG. 2b illustrates an operation of a text block analytics module that may be part of a document reading order processing system according to one embodiment of the present disclosure. Text block analytics module 210 may perform an association of various text runs generated, for example, by an OCR system 206 with particular text blocks 204(1)-204(M). As noted previously, according to alternative embodiments, a document may already exist in a text-based format and therefore an OCR or other optical system is not required. Language information 208 may comprise any data or information characterizing a reading order of a particular language for which a reading order analysis is to be performed. For example, in English, text flows left-to-right and top-to-bottom. However, other languages may utilize a different inherent reading order. For example, for languages such as Arabic, the reading order may be right-to-left and top-to-bottom. Thus, according to some embodiments, rather than defining reading order as left-to-right and top-top bottom, reading order may be defined "horizontal reading direction" and "vertical reading direction. Language information 208 may be utilized by text block analytics module 210 to perform a text block analysis and may indicate, for example, that a particular language such as English has an inherent left-to-right and top-to-bottom reading order According to one embodiment of the present disclosure, text block analytics module 210 may receive a plurality of text runs 202(1)-202(N) generated, for example, by OCR system 206 and associate each of the received text runs 202(1)-202(N) with a particular text block 204(1)-204(N). A detailed operation a text block analytics module 210 is described with respect to FIG. 3c. For purposes of the present discussion, it is sufficient to recognize that text block analytics module 210 may maintain a current text block 204 and associate received text runs 202 with the current text block until an EOS prediction label is predicted by a classifier thereby ascertaining the reading order of a document.

FIG. 2c illustrates R1, R2, R3 text runs and an EOS according to one embodiment of the present disclosure. As shown in FIG. 2c, a text run 202 may be an R2 or R3 text run 202 with respect to a current text run R1 202. That is, if R1 identifies a current text run 202, an R2 text run 202 may comprise a text run 202 to the right (RIGHT) of the R1 text run 202. Furthermore, an R3 text run 202 may comprise a text run down (DOWN) from the current text run R1 202.

FIG. 2d illustrates an alternative identification of an R3 text run with respect to a current R1 text run according to one embodiment of the present disclosure. The scenario shown in FIG. 2d may occur when the current text run R1 202 is at the bottom of a column of a document. In that instance, as shown in FIG. 2d, there exists no R3 text run 202 (DOWN) in the current column. In order to address this, the text run 202 at the top of the next column may be treated as the R3 text run 202 with respect to the current text run R1 202.

Figure 2E:
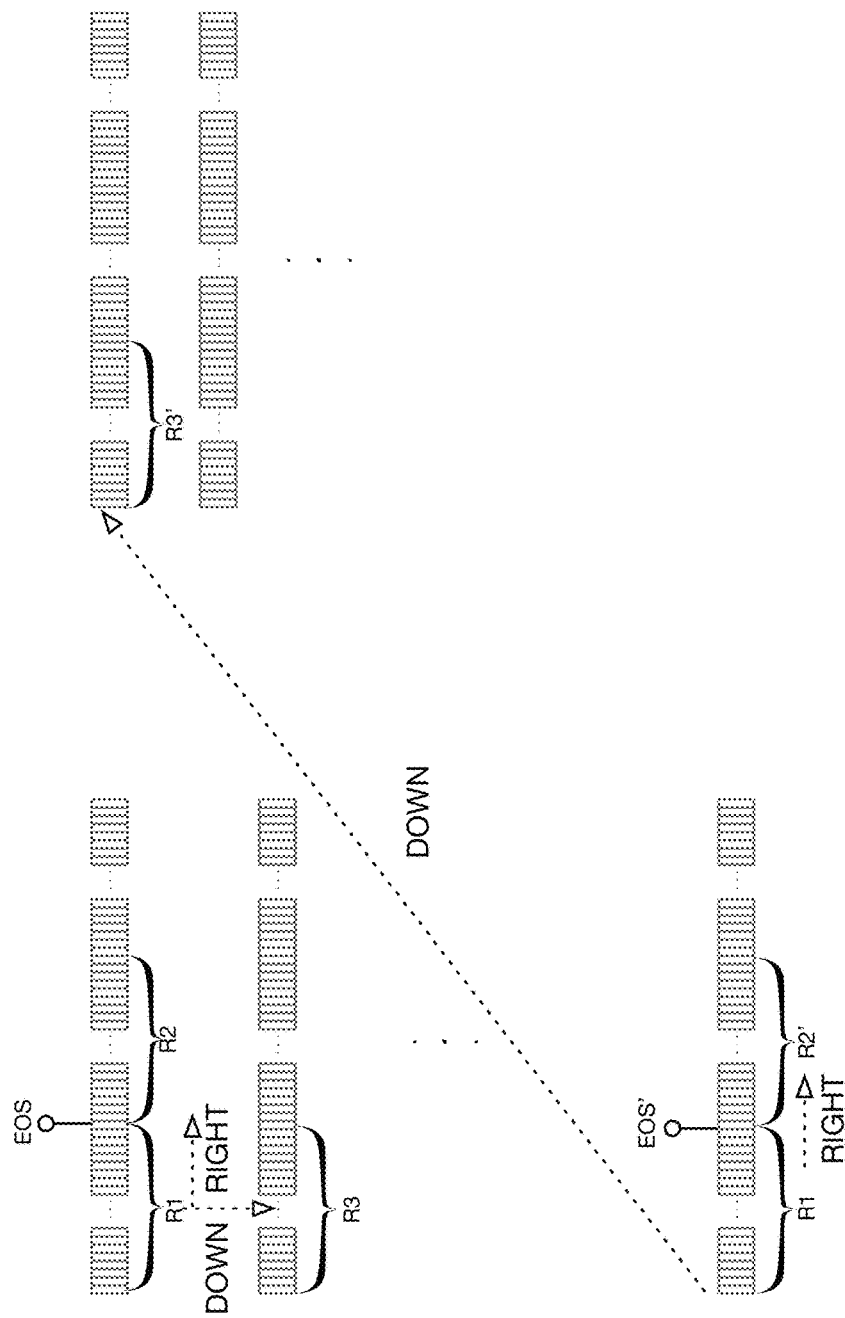
FIG. 2e illustrates various examples of R1, R2 and R3 text runs as well as an EOS according to one embodiment of the present disclosure.

FIG. 2e illustrates various examples of R1, R2 and R3 text runs as well as an EOS according to one embodiment of the present disclosure.

Document Reading Order Processing System

Figure 3A:
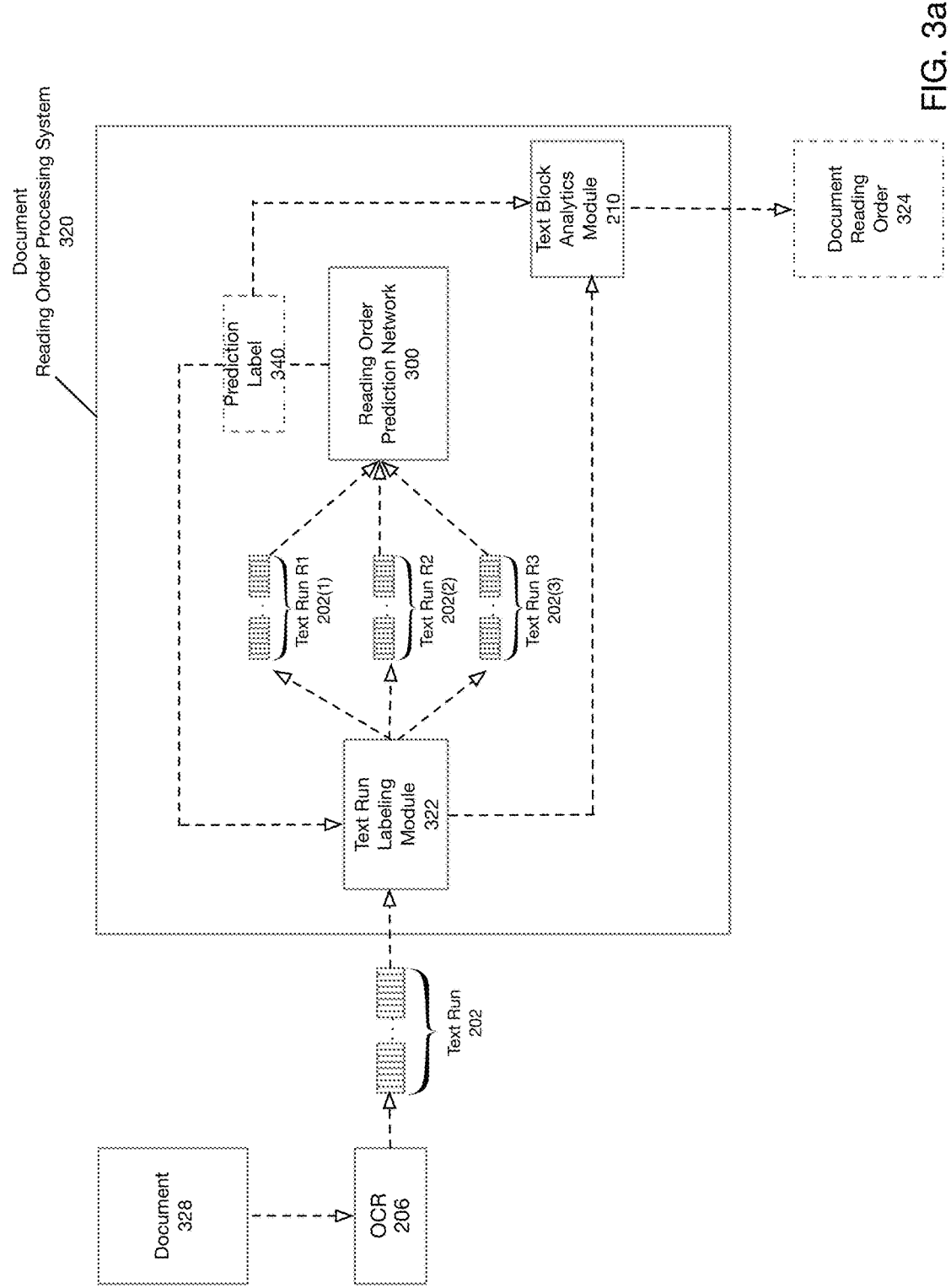
FIG. 3a is a block diagram depicting an operation of a document reading order processing system, according to one embodiment of the present disclosure.

FIG. 3a is a block diagram depicting an operation of a document reading order processing system, according to one embodiment of the present disclosure. As shown in FIG. 3a, document reading order processing system 320 may further comprise text run labeling module 322, reading order prediction network 300 and text block analytics module 210.

Document 328 may be processed by OCR system 206 to generate a plurality of text runs 202. Although FIG. 3a shows only a single text run 202, it will be understood that OCR system 206 may generate any number of text runs 202 either in batch or streaming mode and may provide them to document reading order processing system 320. As previously discussed, text run 202 may comprise any number of characters in a sequence. Furthermore, the number of characters in each text run 202 may vary across iterations of OCR system 206.

Text run labeling module 322 may perform labeling of each text run 202 with a particular label (i.e., R1, R2, R3, EOS) based upon output of reading order prediction network 300 to generate labeled text runs 202(1)-202(3). In particular, as described below with respect to FIG. 3b, text run labeling module 322 may maintain a current R1 text run 202. It may then determine a RIGHT (R2) text run 202 with respect to the current R1 text run 202 as the text run 202 immediately to the right of the current text run R1 202. Similarly, it may also determine a DOWN (R3) text run 202 with respect to the current R1 text run 202 as the text run 202 immediately down from the current text run R1 202. Based upon a prediction label 340 received from reading order prediction network 300, which indicates the next text run 202, text run labeling module 322 may update the current text run R1 202 to either the R2 text run 202 or the R3 text run depending upon the prediction label 340. If prediction label 340 is an EOS, text run labeling module 322 may also update the current text run R1.

Note that text runs 202 entering text run labeling module 322 (e.g., 202) may not be labeled while the text runs 202(1)-202(3) at the output of text run labeling module 322 are labeled as either an R1 text run 202, an R2 text run 202 or an R3 text run 202. Labeled text runs 202(1)-202(3) may then be received by reading order prediction network 300 where they may be processed by reading order prediction network 300 to predict whether the next text run 202 is RIGHT (R2), DOWN (R3) or instead predict an EOS.

As shown in FIG. 3a, reading order prediction network 300 may receive labeled text runs 202(1)-202(3) and generate as output prediction label 340, which may in turn be provided to text run labeling module 322 and text block analytics module 210. According to one embodiment of the present disclosure, prediction label 340 indicates a prediction whether the next text run 202 in the reading order is RIGHT (R2), DOWN (R3) or whether it is an EOS. The structure and operation of a reading order prediction network 300 is described below. For purposes of the present discussion, it is sufficient to recognize that reading order prediction network 300 may comprise any computing structure that that may make an inference regarding a prediction of a label regarding a next text run 202 (i.e., direction—RIGHT, DOWN or EOS) based upon received labeled text runs 202(1)-202(3). An example structure of a reading order prediction network 300 is described below with respect to FIG. 3d.

Text block analytics module 210 may utilize prediction label 340 and labeled text runs 202(1)-202(3) to associate text runs 202(1)-202(3) with particular text blocks 204 (i.e., sentences) to generate document reading order 324. According to one embodiment of the present disclosure, document reading order 324 is an ordered sequence of text runs 202 in which each text run 202 is associated with a particular text block 204 (i.e., sentence).

Figure 3B:
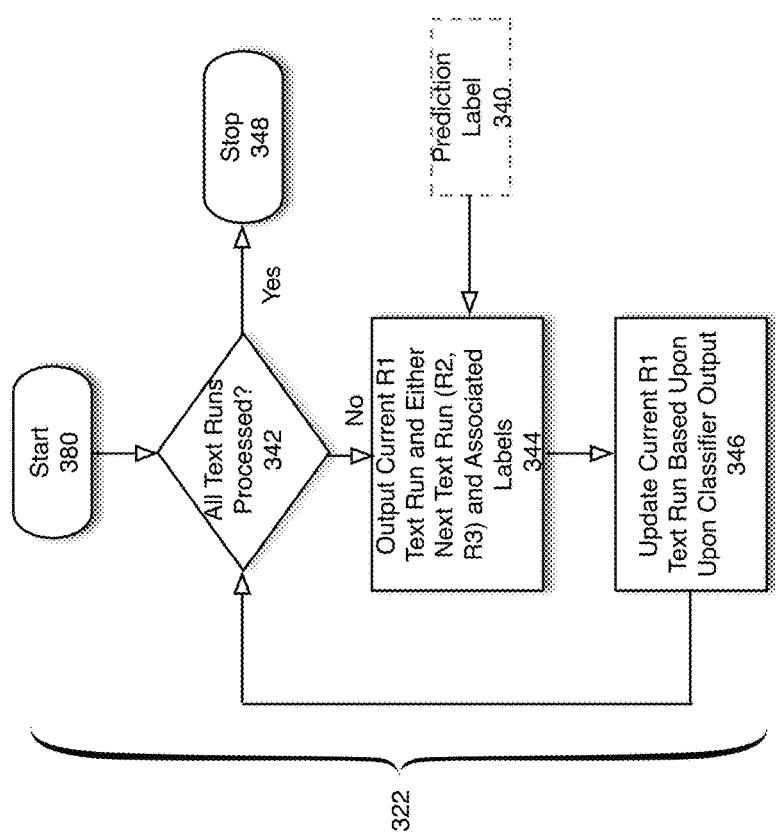
FIG. 3b is a flowchart depicting an operation of a text run labeling module according to one embodiment of the present disclosure.

FIG. 3b is a flowchart depicting an operation of a text run labeling module according to one embodiment of the present disclosure. The process shown in FIG. 3b may be performed by text run labeling module 322 shown in FIG. 3a. According to one embodiment of the present disclosure, text run labeling module 322 may operate to label text runs 202 received by OCR system 206 and maintain a current R1 text run 202 based upon output from reading order prediction network 300.

Referring to FIG. 3b, the process is initiated in 380. In 342, it is determined whether all text runs 202 have been processed (i.e., received from OCR system 206). If so ('Yes' branch of 342), the process ends in 348. If not ('No' branch of 342), flow continues with 344 and the current text run 202 along with a corresponding label R1 is output along with either the text run 202 corresponding to R2 or R3 (and its corresponding label R2 or R3) depending upon prediction label 340 output from reading order prediction network 300.

In 346, the current R1 text run 202 is updated based upon the output of classifier from reading order prediction network 300, and in particular the prediction label 340 generated from reading order prediction network 300. For example, if reading order prediction network 300 generates a prediction label 340 as R2, the current R1 is set to text run 202 associated with R2 (i.e., the text run 202 that is RIGHT with respect to the current text run R1 202). Similarly, if reading order prediction network 300 generates prediction label 340 as R3, the current R1 is set to text run 202 associated with R3 (i.e., the text run that is DOWN with respect to the current text run R1 202).

Figure 3C:
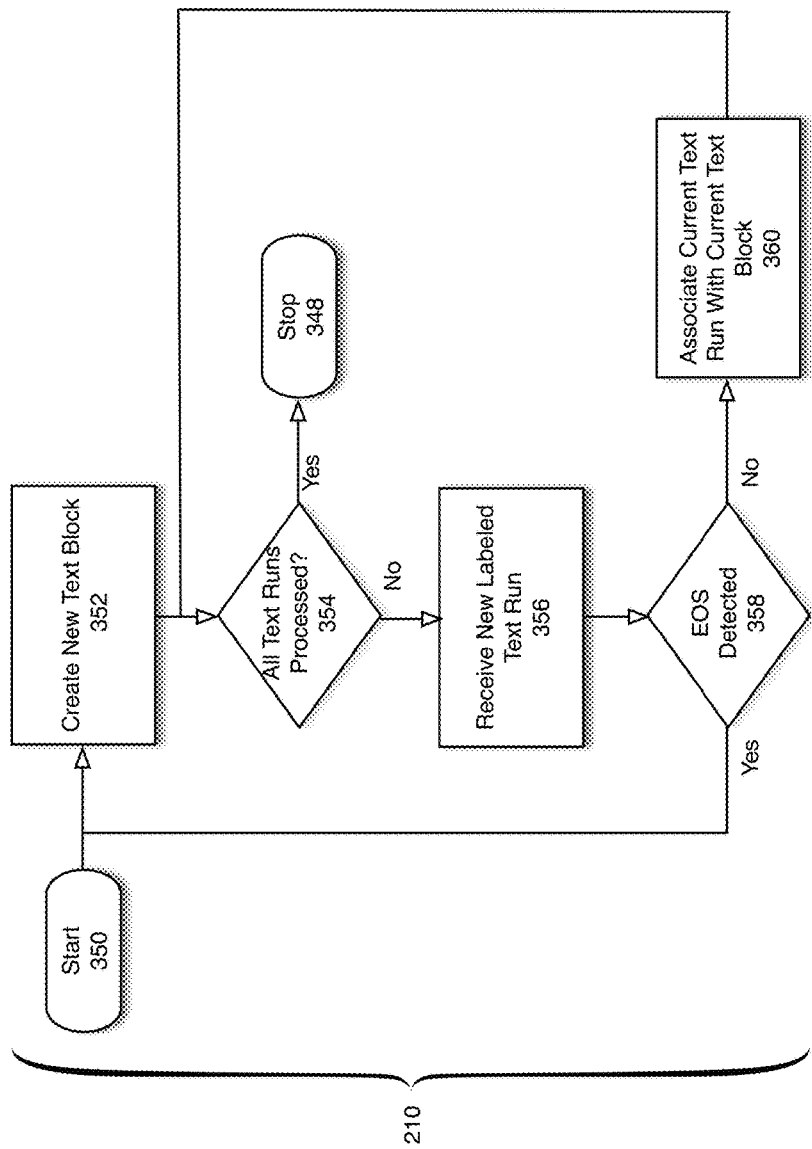
FIG. 3c is a flowchart depicting an operation of a text block analytics module according to one embodiment of the present disclosure.

FIG. 3c is a flowchart depicting an operation of a text block analytics module according to one embodiment of the present disclosure. The process is initiated in 350. In 352, a new text block 204 is created. In 354, it is determined whether all text runs 202 have been processed. If so ('Yes' branch of 354), the process ends in 348. If not ('No' branch of 354), flow continues with 356 and a new labeled text run 202 is received from text run labeling module 322. In 358, it is determined whether an EOS has been detected (i.e., by reading order prediction network 300). If not ('No' branch of 358), flow continues with 360 and the labeled text run 202 received in 356 is associated with the current text block 204. If so ('Yes' branch of 358), flow continues with 352 and a new text block 204 is created.

Figure 3D:
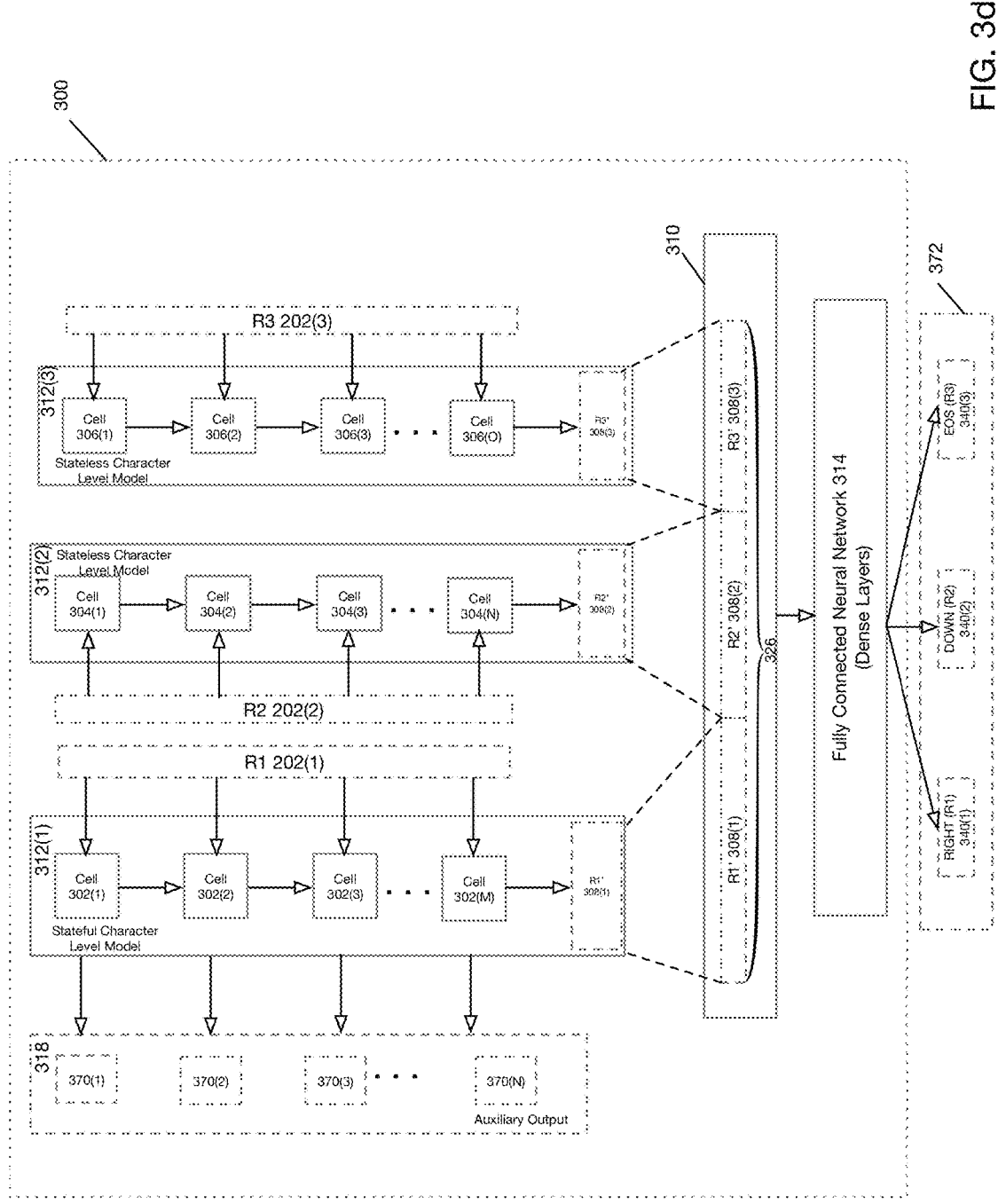
FIG. 3d is a block diagram of a reading order prediction network for performing a document reading order prediction process according to one embodiment of the present invention.

FIG. 3d is a block diagram of a reading order prediction network for performing a document reading order prediction process according to one embodiment of the present invention. According to one embodiment of the present disclosure, reading order prediction network 300 may be utilized by document reading order processing system 320 in order to determine the reading order of document 328. As shown in FIG. 3d, reading order prediction network 300 may further comprise stateful LSTM 312(1) and stateless LSTMs 312(2)-312(3), concatenation block 310 and fully connected neural network 314. As previously described, stateful network 312(1) may comprise an LSTM that is trained using a stateful character level mode (described below). The structure and operation of an LSTM will be described below. For purposes of the current discussion, it is sufficient to recognize that an LSTM may comprise a cell structure that maintains an internal and hidden state and in which its output is fed back to its input in some fashion. This type of topology allows an LSTM to "remember" sequential information. For conceptual clarity, an LSTM may be "unrolled" such as the depiction in FIG. 312(1) to comprise a sequence of repeating cell structures 302(1)-302(M). In addition, each cell 302(1)-302(M) may maintain an internal state based upon the past history of an input signal. However, it should be recognized that this unrolled representation is for conceptual clarity and does not represent the actual logical or physical structure of an LSTM.

According to one embodiment of the present disclosure, network 312(1) is stateful in the sense that during a character level model training process its internal state is not reset at any point during training except when an EOS is detected. Thus, stateful network 312(1) may generate an internal representation R1' 308 of the entire history of character training data. As will be described below, stateful network 312(1) may be trained using a character level model. That is stateful network 312(1) may be trained to predict the next character in a sequence of input characters from a corpus of documents 328. In particular, according to one embodiment of the present disclosure, auxiliary output 318 generated by stateful network 312(1) may comprise a series of character predictions 370(1)-370(N) based upon the past input. As will be described below, auxiliary output 370(N) and final output 372 may be utilized to train stateful network 312(1).

Stateless networks 312(2)-312(3) may also comprise LSTMs. According to one embodiment of the present disclosure, stateless networks 312(2)-312(3) utilize identical models. Stateless networks 312(2)-312(3) are stateless in the sense that during training an internal state of these networks may be reset periodically, for example after every training batch. According to one embodiment of the present disclosure and as described in more detail below stateless networks 312(2)-312(3) utilize a character level model and are trained to predict a next character in an input sequence. In contrast with stateful network 312(1), however, during training an internal state of (i.e., LSTM state) stateless networks 312(2)-312(3) are reset periodically (for example after each training batch). For purposes of explanation, in this disclosure, the networks 312(1) will be referred to as stateful and the networks 312(2)-312(3) as stateless to refer to the training method utilized. It should also be recognized that some embodiments according stateless networks 312(2)-312(3) are identical in the sense that they comprise the same underlying stateless character level model and are thereby trained in an identical fashion. In particular, according to some embodiments, because networks 312(2)-312(3) are identical, only one of them needs to be trained.

As shown in FIG. 3d, an R1 labeled text run 202(1) is provided to stateful network 312(1) while R2 text runs 202(2)-202(3) are respectively provided to stateless networks 312(2)-312(3). This scenario can be better understaff referring back to FIG. 3a whereby text run labeling module 322 generates labeled text runs R1 (202(1)), R2 (202(2)) and R3 (202(3)). These labeled text runs 202(1)-202(3) are respectively provided to stateful network 312(1) and stateless networks 312(2)-312(3) as input. In providing these inputs each respective network (312(1)-312(3)), the inputs are processed by the respective LSTM networks 312(1)-312(3) such that each LSTM develops a respective internal representation based upon the respective input (i.e., R1→R1', R2→R2', R3→R3'). Thus, as shown in FIG. 3d, stateful network 312(1) generates internal representation R1' 308(1) while stateless networks 312(2)-312(3) respectively generate internal representations R2' 308(2) and R3' 308(3). According to one embodiment of the present disclosure internal representations 308(1)-308(3) may comprise tensors as understood in the context of neural network processing. That is, a tensor in this context may comprise a multidimensional array.

Each internal representation 308(1)-308(3) (i.e., R1', R2' and R3') may then be provided to concatenation block 310, which may generate a concatenated representation of internal representations 308(1)-308(3) by concatenating internal representations 308(1)-308(3) into a single vector or tensor 326, which is herein referred to as a concatenated representation. As shown in FIG. 3d, concatenated representation 326 may be provided to fully connected neural network 314, which may generate as output a classification prediction or final result 372 comprising one of the prediction labels 340(1)-340(3). As shown in FIG. 3d, prediction labels 340(1)-340(3) respectively indicate a prediction that the next text run 202 is to the right (RIGHT—R1), down (DOWN—R2) or an end of statement(sentence) (R3—EOS)

According to one embodiment of the present disclosure, fully connected neural network 314 may perform a classification function and may include a softmax layer utilizing a cross-entropy loss function. However, many variations are possible for the structure of fully connected neural network 314 so long as it provides a classification function.

LSTMs

As previously described, stateful network 312(1) and stateless networks 312(2)-312(3) may be RNNs and in particular LSTM networks. Recurrent neural networks are well understood. However, for purposes of a brief explanation, some discussion of recurrent neural networks and LSTM properties are reviewed.

Due to the fact that temporal dependencies may be many time steps apart, standard RNNs generally may suffer what is known as the exploding/vanishing gradients problem, in which the gradients computed in the backpropagation through time algorithm may become extremely large (exploding) or very small (vanishing), which leads to numerical instabilities, thereby mitigating the effectiveness of RNNs. LSTMs may address the vanishing/exploding gradients problem.

Figure 4A:
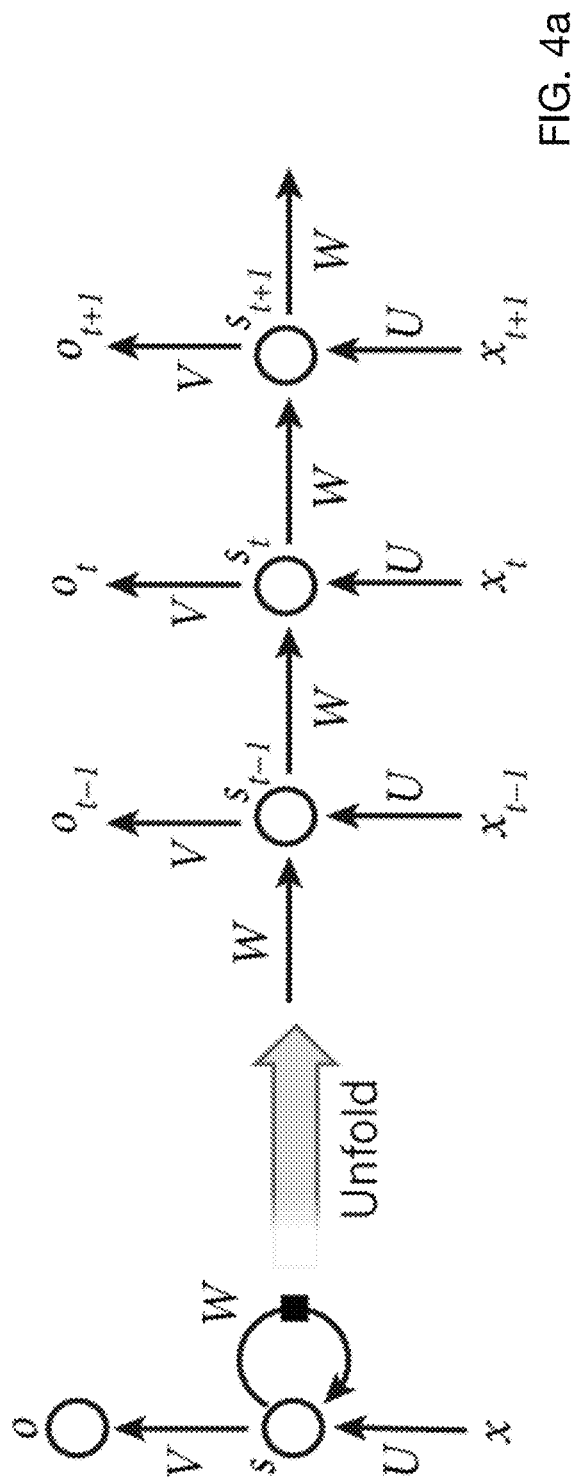
FIG. 4a depicts an operation of a recurrent neural network according to one embodiment of the present disclosure.

FIG. 4a depicts an operation of a recurrent neural network according to one embodiment of the present disclosure. Typically, recurrent neural networks ("RNNs') have the form of a chain of repeating modules of neural network. That is, the operation of a recurrent neural network may be understood as repeating a single cell indexed by time. In order to provide this recurrent behavior, recurrent neural networks may maintain a hidden state $s_t$, which is provided as input to the next iteration of the network. For purposes of this discussion the variables $s_t$ and $h_t$ will be used interchangeably to represent the hidden state of a RNN. Thus, as shown in the left portion of FIG. 4a, a recurrent neural network may receive input from a current time sample $x_t$ as well has the hidden state $s_{t-1}/h_{t-1}$ from the previous time sample fed back to the input. The equation governing the update to the hidden state $s_t/h_t$ may be expressed as follows:

$$s_t = \phi(Ux_t + Ws_{t-1})$$

where $\phi$ is typically a non-linear function such as tan h or ReLU.

The output of the recurrent neural network may be expressed as:

$$o_t = \text{softmax}(Vs_t)$$

The hidden state $s_t/h_t$ may be understood as the memory of the network. In particular, $s_t/h_t$ captures information about what happened in all the previous time steps. The output at step $o_t$ is calculated solely based on the memory at time t.

Figure 4B:
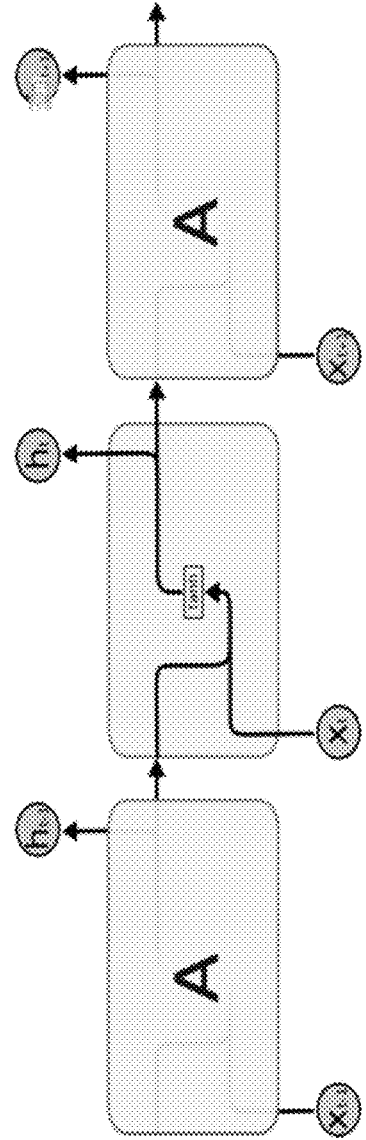
FIG. 4b depicts a more detailed example of an operation of a RNN that has been unrolled for analytical clarity.

FIG. 4b depicts a more detailed example of an operation of a RNN that has been unrolled for analytical clarity. In this diagram, $\phi$ is specifically shown as the tan h function and the linear weights U, V and W are not explicitly shown. Unlike a traditional deep neural network, which uses different parameters at each layer, a RNN shares the same parameters (U, V, W above) across all steps. This reflects the fact that the same task is being performed at each step, just with different inputs. This greatly reduces the total number of parameters to be learned.

Although FIGS. 4a-4b show outputs at each time step, depending on the task, this may not be necessary. For example, when predicting the sentiment of a sentence only the final output may be important, not the sentiment after each word. Similarly, inputs at each time step may not be necessary. The main feature of a RNN is its hidden state $s_t$, which captures some information about a sequence.

Figure 4C:
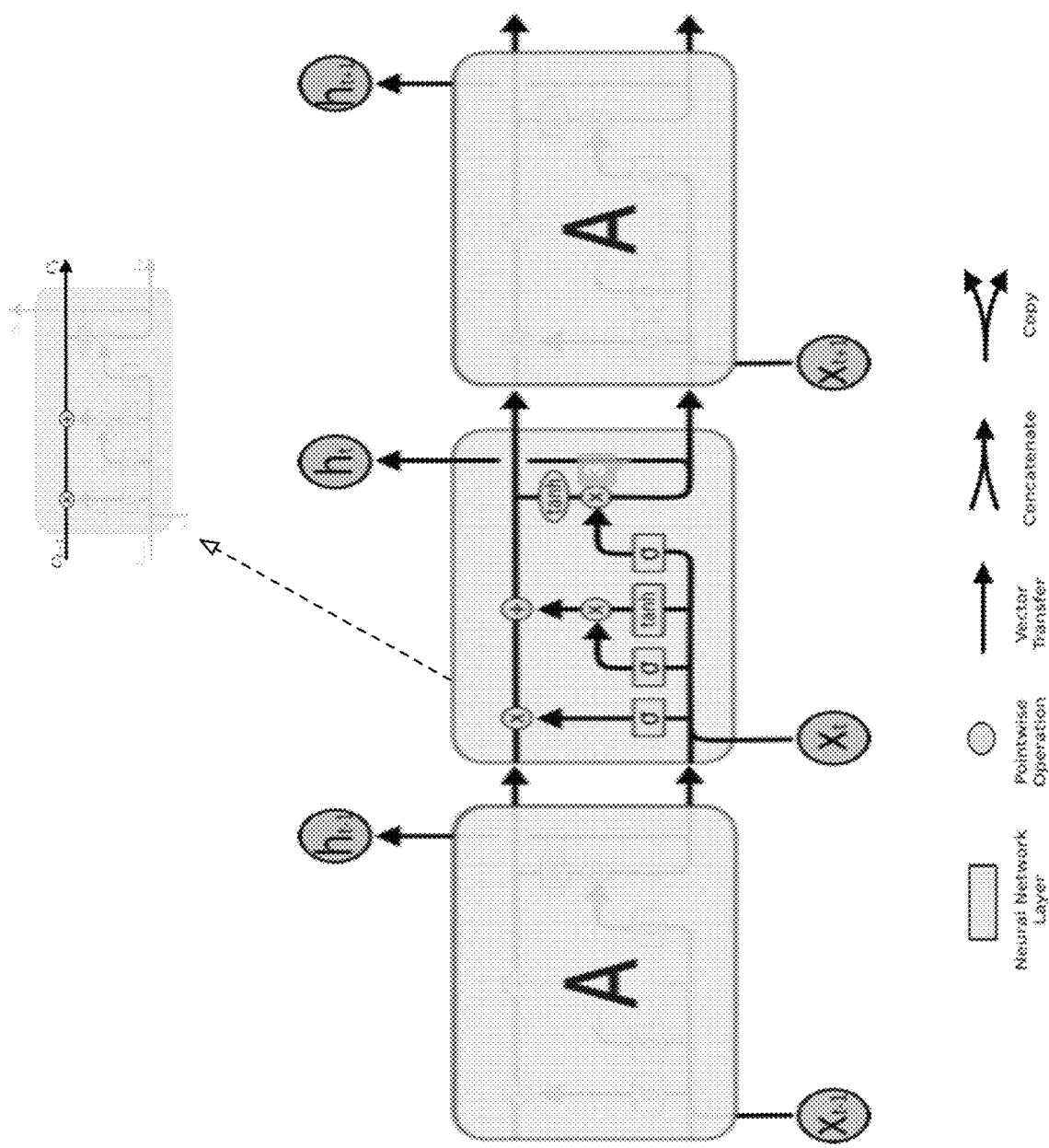
FIG. 4c depicts an operation of an LSTM according to one embodiment of the present disclosure.

FIG. 4c depicts an operation of an LSTM according to one embodiment of the present disclosure. An LSTM may be understood as a special kind of RNN, capable of learning long-term dependencies. In particular, an LSTM may avoid the long-term dependency problem that may be intractable with conventional RNNs due to the vanishing/exploding gradients problem. As shown in FIG. 4c, according to one embodiment of the present disclosure, an LSTM may comprise a series of cells, similar to a general RNNs shown in FIGS. 4a-4b. Similar to a general RNN, each cell in the LSTM operates to compute a new hidden state for the next time step.

As shown in FIG. 4c in addition to maintaining and updating a hidden state $s_t/h_t$, an LSTM may maintain a cell state $C_t$. Further, as shown in FIG. 4c, rather than a single layer for a standard RNN such as the tan h layer shown in FIG. 4c, an LSTM may allow the capability to add or remove information from the cell using a set of gates. A gate may comprise a sigmoid function coupled to a pointwise or Hadamard product multiplication function, where the sigmoid function is:

$$\sigma = \frac{1}{1+e^{-z}}$$

and the Hadamard product is indicated by the $\otimes$ symbol (it may also be represented by the symbol $\circ$). According to embodiments of the present disclosure, gates may allow or disallow the flow of information through the cell. As the sigmoid function is between 0 and 1, that function value controls how much of each component should be allowed through a gate. Referring again to FIG. 4c, it can be seen that an LSTM cell may comprise 3 gates, a forget gate, an input gate and an output gate.

Figure 4D:
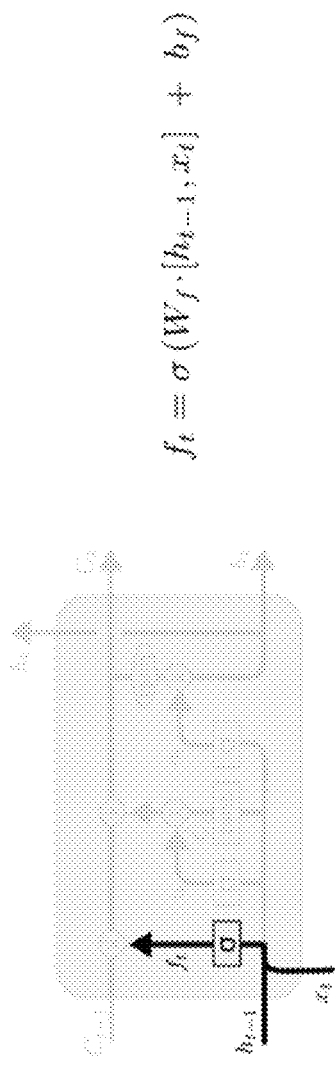
FIG. 4d shows a detailed view of a forget gate according to one embodiment of the present disclosure.

FIG. 4d shows a detailed view of a forget gate according to one embodiment of the present disclosure. The forget gate shown in FIG. 4d may determine what information to discard in the cell state based on the previous hidden state $h_{t-1}$ and the current input $x_t$. In particular, an output of the forget gate may be represented as:

$$f_t = \sigma(W_f[h_{t-1}, x_t] + b_f)$$

where $W_f$ is some scalar constant and $b_f$ is a bias term and the brackets connote concatenation.

Figure 4E:
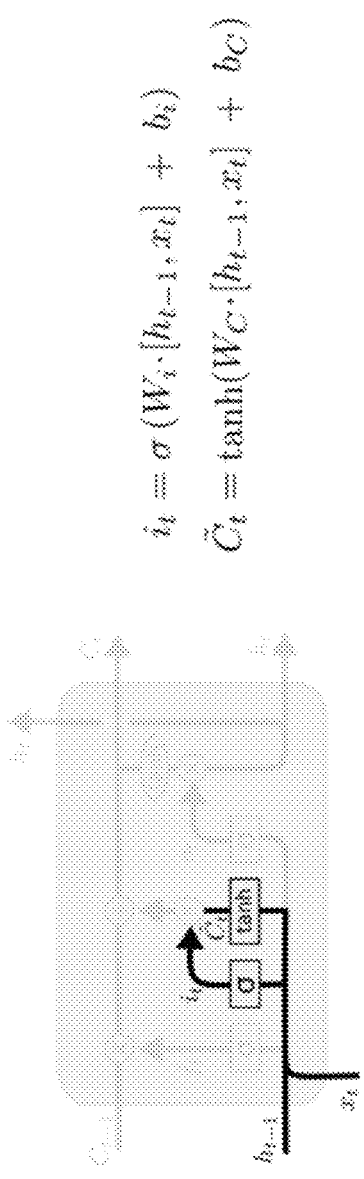
FIG. 4e depicts a first phase operation of an input gate according to one embodiment of the present disclosure.
Figure 4F:
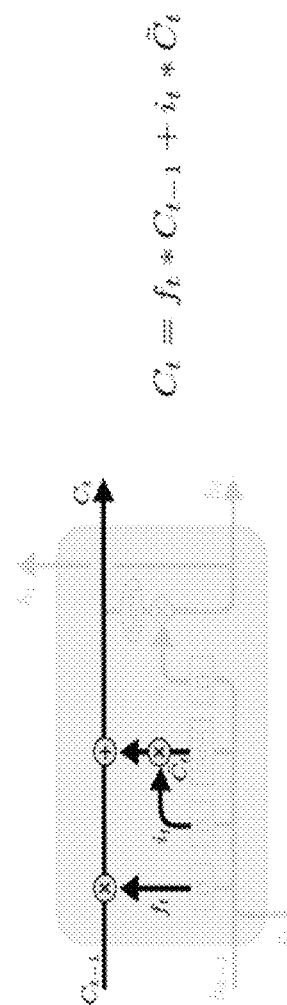
FIG. 4f depicts a second phase operation of an input gate according to one embodiment of the present disclosure.

FIGS. 4e-4f depict an operation of an input gate of an LSTM for storing information according to one embodiment of the present disclosure. According to one embodiment, this operation may be performed in two phases shown respectively in FIGS. 4e and 4f. In particular, FIG. 4e depicts a first phase operation of an input gate according to one embodiment of the present disclosure. As shown in FIG. 4e, first a sigmoid layer referred to as the "input gate layer" determines which values to update. Next a tan h layer may create a vector of new candidate values $\widetilde{C}_t$ that may be added to the state. These operations may be expressed by the following relations:

$$i_t = \sigma(W_i[h_{t-1}, x_t] + b_i)$$

$$\widetilde{C}_t = \tan h(W_c[h_{t-1}, x_t] + b_c)$$

FIG. 4f depicts a second phase of an operation of an input gate according to one embodiment of the present disclosure. As shown in FIG. 4f, the old state $C_{t-1}$ may be multiplied by $f_t$ to cause the forgetting of information (as determined in FIG. 4d). Next, the new candidate values of the cell state $i_t \otimes \widetilde{C}_t$ are added to the previous cell state $C_{t-1}$. This may be expressed by the relation:

$$C_t = f_t \otimes C_{t-1} + i_t \otimes \widetilde{C}_t$$

Figure 4G:
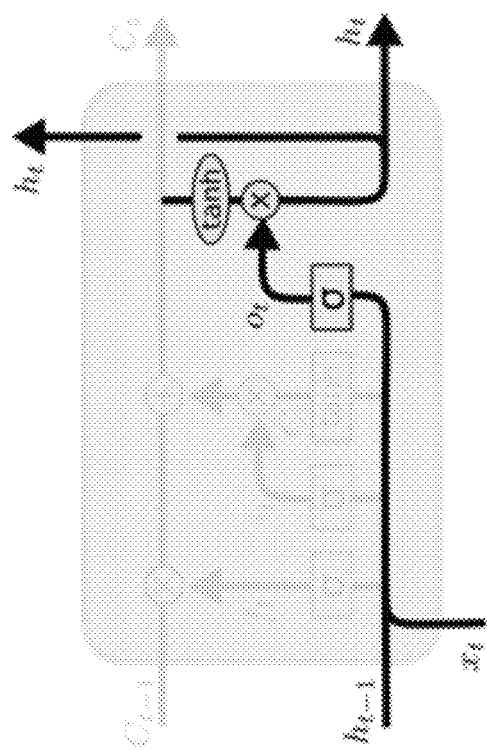
FIG. 4g depicts an operation of an output gate according to one embodiment of the present disclosure.

FIG. 4g depicts an operation of an output gate according to one embodiment of the present disclosure. According to one embodiment of the present disclosure, the output may be based on the cell state $C_t$, but may be filtered. In particular, according to one embodiment, first, a sigmoid layer may be applied that decides what parts of the cell state $C_t$ to output. Next the cell state $C_t$ may be processed through a tan h function (to cause the values to be between −1 and 1) and then multiplied by the output of the sigmoid gate, to selectively output only the parts that were decided to output. The operation of an output gate may be expressed by the relations:

$$o_t = \tau(W_o[h_{t-1}, x_t] + b_o)$$

$$h_t = o_t \otimes \tan h(C_t)$$

The structure of an LSTM as depicted in FIGS. 4c-4g is only one example. According to other embodiments, for example, a gated recurrent unit ("GRU") may be used or some other variant. In addition, the internal structure as shown in FIGS. 4c-4g may be modified in a multitude of ways, for example, to include peephole connections, for example.

Training

First Phase—Character Level Language Model Stateless Network Training

According to one embodiment of the present disclosure, in a first phase of training, a character level language model (i.e., for stateless networks 312(2)-312(e)) using LSTM cells is used to generate vector representations for text sequences. The hidden state of the LSTM (i.e., 312(2)-312(3)) may then be used as the representation of the sequence of the characters fed into the LSTM. Because the determination of reading order in a document 328 requires independent vector representations for a sequence of characters, the internal states of the LSTM (312(2)-312(3)) may be reset with every batch while training the model. This makes the LSTM stateless across different input batches. According to one embodiment of the present disclosure, a chunk of T consecutive characters from a character sequence is herein referred to as a batch. The model trained during this first phase is referred to as the stateless model.

According to some embodiments, the number of time steps in a batch may be selected by taking into consideration the maximum length of sequence of characters for a desired vector representation. According to one embodiment of the present disclosure, the hidden state of the LSTM (312(2)-312(3)) at the end of processing a batch is considered as the vector representation for the batch (i.e., internal representations 308(2)-308(3)).

According to one embodiment of the present disclosure, because the first phase comprises training a general character level language model, the large amount of publicly available textual corpora may be utilized. For example, according to one embodiment of the present disclosure, scraped text data from sources like Wikipedia, Reddit etc. may be used to train the first phase model over the corpus. Given that the final use case is to determine the reading order for forms, the model may then be fine-tuned using document data.

As will be described below in the second phase of the solution, the character level language model generated in the first phase may then be used to generate vector representations of the text runs 202 detected by the existing network.

Due to practical restrictions, the length of all the text runs 202 detected by the networks 312(2)-312(3)) will not be same. In order to account for this, according to one embodiment of the present disclosure, the end of each input batch may be padded with null characters. The number of null characters padded at the end of each input batch may be sampled from a suitable probability distribution. The null padding operation may ensure that the model will not behave arbitrarily at inference time on feeding a padded input batch. In particular, according to some embodiments, because the text runs are not all of the same length, smaller text runs may be padded at their respective ends. This situation arises during the inference phase of the solution described herein. In order to account for this potential inefficiency, during the training phase, the input is padded at random points from a suitable probability distribution so that model remains robust during the inference phase.

According to one embodiment of the present disclosure, the perplexity of the predictions on an input batch may be used as a measure of the performance of the model. The lower the perplexity model, the better it is at generating vector representations of the text runs 202. According to one embodiment of the present disclosure, the best average perplexity per batch obtained on a validation set of 136827954 characters when trained in corpus of 319267324 characters was 4.08686 with 20 characters in each input batch. With this example, an average perplexity per batch obtained on the training set in this case was 4.016625.

Figure 5A:
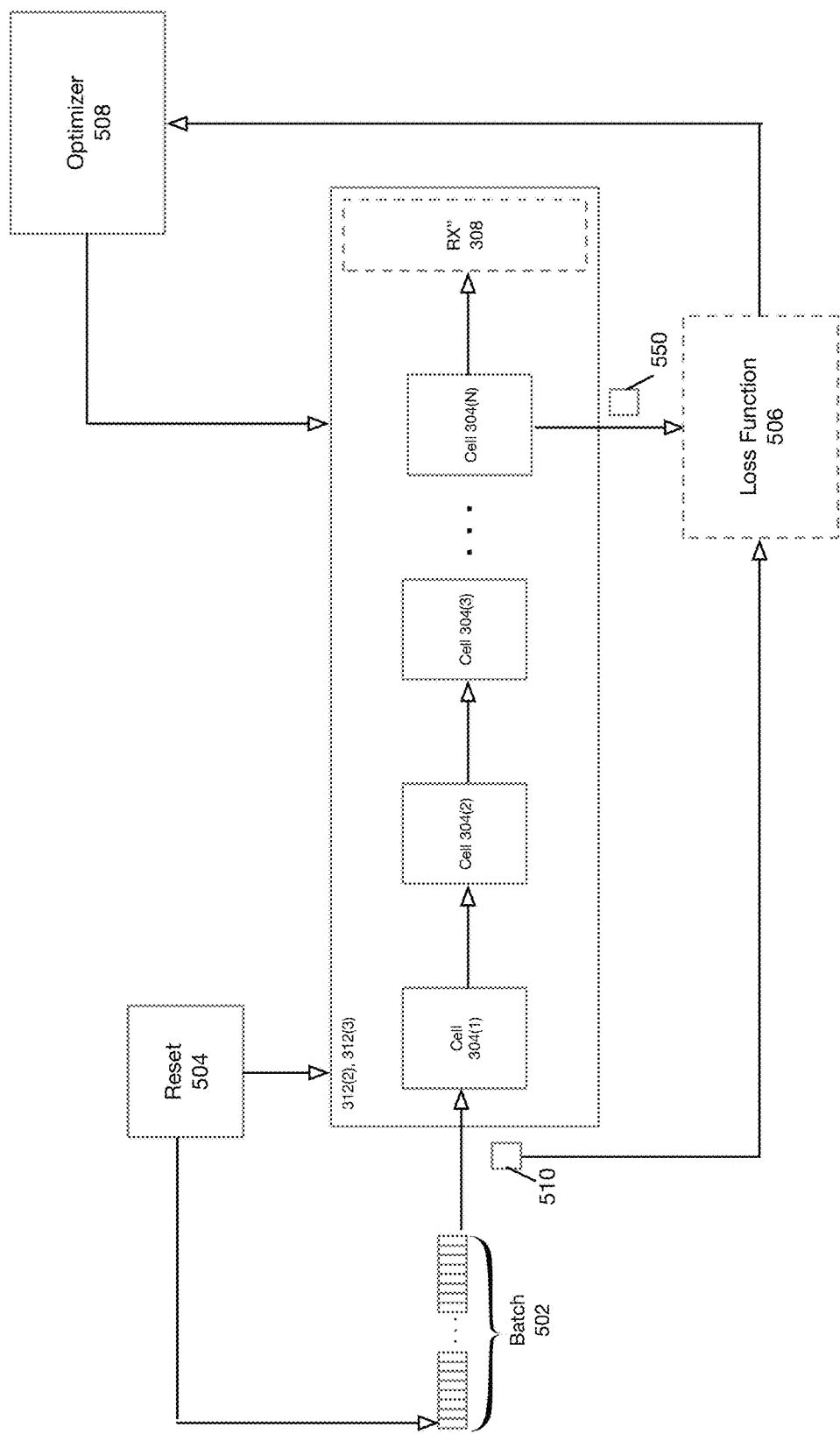
FIG. 5a depicts a training operation for a stateless network according to one embodiment of the present disclosure.

FIG. 5a depicts a training operation for a stateless network according to one embodiment of the present disclosure. As shown in FIG. 5a, both LSTM networks 312(2) and 312(3) shown in FIG. 3d may be trained using the method depicted. In particular, as previously described, networks 312(2) and 312(3) may be LSTMs and according to one embodiment utilize identical stateless character level models. For purposes of the present discussion in order to simply the discussion, it is assumed that training will be performed for network 312(2). It will be understood that an analogous process may be applied to network 312(3).

As shown in FIG. 5a, according to one embodiment of the present disclosure, batch 502 may be provided to the input of network 312(2). According to one embodiment of the present disclosure, a batch may comprise a chunk of T consecutive characters from a character sequence. As will be described below, to make training computationally faster, gradient updates of the parameters may be performed only once per batch rather than at each time step. According to one embodiment of the present disclosure, training data for a sequence of characters comprising a batch 502 may be obtained from documents 328 in which the reading order has been manually determined, for example. Thus, as shown in FIG. 5a, reset block 504 may reset the in internal state (representation) generated by network 312(2) upon the completion of a batch.

As shown in FIG. 5a, loss function 506 may be applied to the output of the final cell 304(N) to compare a predicted next character 550 of network 312(2) to the actual next character 510 in batch 502. According to alternative embodiments, the output of every cell 304(1)-304(N) is provided to loss function 506 to compute a loss of a single batch. According to one embodiment of the present disclosure an L2 loss function may be utilized. The output of loss function 506 may then be provided to optimizer 508, which may then update the parameters of network 312(2) based upon a gradient descent method or some other optimization method. As described below, a truncated backpropagation through time algorithm may be applied. According to some embodiments of the present disclosure, because the state of the network is reset after every batch, truncated backpropagation through time may not be used. Rather, the loss for all the mis-predicted characters is calculated for a batch and the gradients for the loss are used to update the network.

The training of the stateless LSTM (312(2)-312(3)) may be performed in such a manner that it aligns its internal state so that it may predict the next character in a character sequence. In particular, according to some embodiments, character batches that represent correct reading order of associated documents may be provided to the stateless LSTM. That is, the character sequence in a batch 502 may represent a correct reading order of a document. The stateless LSTM's hidden state (i.e., 312(2)-312(3) will represent what the LSTM has seen up to this point. According to one embodiment of the present disclosure, the stateless LSTMs 312(2)-312(3) may be trained until it a desired accuracy given by a metric is achieved.

According to some embodiment of the present disclosure, during training, a noise signal may be introduced into a batch 502 to, for example, randomly drop characters, add white spaces, etc. in order to mimic the actual data set. The noise signal may reflect errors introduced by OCR system 206 performing an associated OCR process. This makes stateless LSTM (i.e., 312(2)-312(3)) more robust to actual data set. That is, according to one embodiment of the present disclosure, when training the stateless character level model, the data may be pre-processed by introducing certain mutations (such as dropping/replacing characters at random places, splitting words at random places etc.). These mutations may help to make the data resemble the real data more closely and make models more applicable for the real data that is used for inference.

Second Phase—Supervised Training to Learn to Decide the Reading Order of Each Text Run—Stateful Network Training According to one embodiment of the present disclosure, in a second phase, training is performed on a character level language model using LSTM cells that maintains the context of text runs 202 explored by the network that belong to a single text block 204. This is referred to herein as the stateful model. According to one embodiment of the present disclosure, the internal state of the stateful model is reset at each encounter of an EOS to maintain different contexts for different text blocks 204.

For example, assume that the current text run 202 is R1 and that text runs 202 in the R2 (RIGHT) and R3 (DOWN) directions are determined for example by a text run labeling module 322. According to one embodiment of the present disclosure, the current text run R1 202 is fed into the stateful model and the text runs R2 and R3 202 are both fed into the stateless model. The internal vector/tensors representations generated for R1, R2 and R3 (R1', R2' and R3') may then be concatenated into a single vector/tensor that represents the complete state of parsing R'=[R1' R2' R3']. This unified representation R' may then be utilized for classification of the next text run 202 as RIGHT (R2), DOWN (R3) or EOS.

According to one embodiment of the present disclosure, both the weights of the stateful model (i.e., the weights associated with LSTM 312(1)) and a softmax classifier associated with fully connected neural network 314 may be trained simultaneously treating the character level output of the stateful model at each step of the sequence as auxiliary output and the softmax output prediction labels (340(1)-340(3)) for the sequence of characters in R1, R2 and R3 as the main output.

Figure 5B:
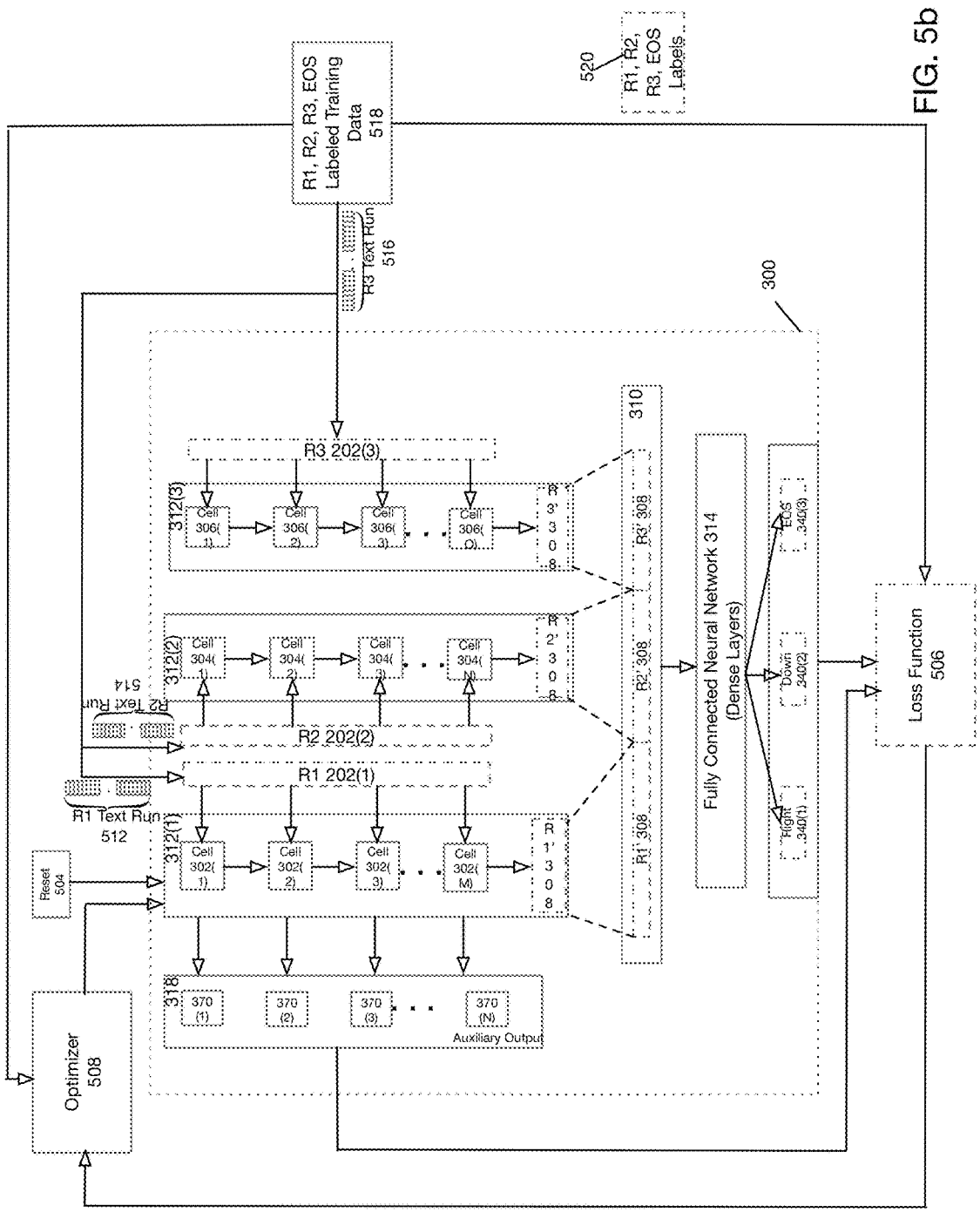
FIG. 5b depicts a training operation for a stateful network according to one embodiment of the present disclosure.

FIG. 5b depicts a training operation for a stateful network according to one embodiment of the present disclosure. The training configuration shown in FIG. 5b may be utilized to train stateful network 312(1) and the corresponding character level stateful model underlying that network. As previously discussed, stateful network 312(1) may be an LSTM. Referring to FIG. 5b, R1, R2, R3 and EOS labeled training data 518 may be utilized to train the stateful model. According to one embodiment of the present disclosure, labeled training data 518 may comprise labeled text runs 202 for which the reading order of various RIGHT and DOWN text runs 202 with respect to a current text run R1 202 (i.e., R2 and R3) have already been labeled.

As shown in FIG. 5b, labeled training data 518 may be segmented into R1 labeled text run training data 512, R2 labeled text run training data 514 and R3 labeled text run training data 516. The R1 labeled text run training data 512 may be provided as input to stateful network 312(1) while the R2 labeled text run data 514 and R3 labeled text run data 516 may respectively be provided as input to LSTM networks 312(2)-312(3). Auxiliary output 318 associated with network 312(1), which may indicate a next character prediction may be provided to loss function 506 along with text run training labels 520 as well as the prediction label (i.e., one of 340(1)-340(3)) generated by the output of a softmax associated with fully connected network 314. Loss function may then generate a loss computation, for example, using a cross-entropy loss function that is provided to optimizer 508. Optimizer 508 may perform a backpropagation through time (truncated or non-truncated) process in order to train the parameters of stateful network 312(1) (i.e. using a gradient descent method, for example).

According to one embodiment of the present disclosure, as discussed, loss function 506 may be a cross-entropy loss function. The cross-entropy loss function may be expressed as:

$$E_t(y_t, \hat{y}_t) = -y_t \log \hat{y}_t$$

$$E_t(y, \hat{y}) = \sum_t E_t(y_t, \hat{y}_t)$$

$$= -\sum_t y_t \log \hat{y}_t$$

where $y_t$ is the target (correct) word at each time step t and $\hat{y}_t$ is the prediction. Typically, the full sequence may be treated as a single training example so that the total error is the sum of errors at each time step. According to one embodiment of the present disclosure, as described below, an RNN/LSTM may be trained utilizing the backpropagation through time algorithm, which is similar to backpropagation for a feedforward neural network.

Truncated Backpropagation Through Time

Training of RNNs (i.e., networks 312(1)-312(3)) may be computationally expensive due to the increasing length of the sequence because to evaluate the gradient with respect to the parameters of the model, the error at each time step has to be backpropagated all the way back to the first time step. To mitigate this problem, the number of time steps to which the error at a time step is propagated may be limited. This is referred to as truncated backpropagation through time. According to some embodiments of the present disclosure a truncated backpropagation through time process is utilized for training as described below. As previously discussed, the input to the system in chunks of T consecutive elements from the sequence is referred to as a batch. To make training computationally faster, gradient updates of the parameters may be performed only once per batch rather than at each time step.

Assuming a fixed batch size of T, according to one embodiment of the present disclosure, a truncated backpropagation through time process may be performed as follows:

At t=1, parameters of the network are updated using the gradient of the loss at the first time step;

At t=2, a gradient is calculated by the loss at this time step and this loss is backpropagated to the first time step;

At t=3, gradient is calculated by the loss at this time step and this loss backpropagated to t=2 and t=1.

Analogous operations are performed for time steps t=4, t=5 until t=T;

At t=T+1, the internal state of the network is maintained, but the loss at this time step is not backpropagated and the gradient is calculated using the loss only at this time step;

At t=T+2, the gradient is calculated by taking the loss at this time step and by backpropagating this loss to time step t=T+1;

The process is repeated for the entire input sequence.

According to one embodiment of the present disclosure, an alternate form of backpropagation through time is used to calculate the losses for each timestep t=1 through t=T and then the cumulative loss is utilized to update the network parameters rather than updating the parameters for each t=1 through t=T.

Training and Test Datasets

According to some embodiments of the present disclosure, a large amount of publically available language corpora (from the sources like Wikipedia and Reddit) may be used as training data. According to one embodiment sentences with length in a specified range may be extracted. To generate the data, two sentences may be arbitrarily selected and filtered the corpus (sentence A and sentence B). According to this embodiment, sentences A and B may then be broken at random points to generate text runs 202 and the different text runs 202 jumbled to generate a synthetic dataset which is then fed into document reading order processing system 320 to determine the correct reading order. In particular, according to one embodiment of the present disclosure, a language corpus is split into training and validation sets (e.g., an 80/20 proportional split). Then, pairs of sentences in the training data may be chosen. The reading order problem may then be simulated by splitting two sentences A and B and arranging them horizontally (side-by-side) or vertically (beneath one another). According to some embodiments, the sentences may be mutated to simulate noisy behavior of OCR. Because the reading order is known (i.e., all fragments of A are in order followed by all fragments of B in order), the pair of sentences arranged side-by-side or below one another as labeled training examples may be used to train the system. The effectiveness of the trained system may be checked against pairs of sentences in the validation set.

EXAMPLES AND RESULTS

FIG. 6 depicts an example document for which a reading order is to be determined according to one embodiment of the present disclosure. As show in FIG. 6, the example document 328 contains three sections, one for stating the "Units Sold" and the "Total Sales Amount", another section for "Signature" and the last section providing "Additional Instructions." The last section spans over two columns without any explicit line separator between the columns. Whenever an applicant reads additional instructions, he/she reads the left column first and then the right column rather than jumping between the two sections while reading the lines. While the applicant does not have any trouble figuring out the correct reading order, the same does not hold for a conventional machine learning system. It is very difficult with the existing capabilities to distinguish between the two columns by just inferencing through visual modalities due to the absence of any explicit separator between the two columns.

However, using the techniques described in this disclosure, a document reading order processing system 320 may infer the correct reading order of document 328 as the following examples illustrate. Referring to document 328 shown in FIG. 6, "Type of Sale: P1" is a text run 202 which is part of the text block 204 "Type of Sale: Place one of the following codes by each . . . ".

According to one embodiment of the present disclosure, text runs 202 may be parsed sequentially as they are detected from document 328. While parsing document 328, for each text run 202, document reading order processing system 320 may infer which text run 202 will maintain the context ahead of the current one in the reading order so that they are associated with the same text block 204 (i.e., see discussion above with respect to FIG. 3a). For notational consistency, the current text run 202 is referred to as R1. Document reading order processing system 320 may then infer the text run 202 next in the reading order and then move to it by updating R1 to be associated with the next text run 202. While moving sequentially, document reading order processing system 320 may mark the text run 202 considered as "EXPLORED".

As previously discussed, for any text run 202, there exist three possibilities related to the determination of the reading order at the current text run R1 202. The first possibility is that the reading order moves in the left to right direction. This means that the next text run 202 in the reading order is the one which located spatially to the right of the current text run 202 (RIGHT or R2 text run 202). For example, assume that document reading order processing system 320 is currently parsing R1="watercraft used or". Then the text run R2 202="capable of being" is to the "RIGHT" of R1 and follows "watercraft used or" in the reading order.

The second possibility is that the reading order breaks at this point and moves to the next line (DOWN or R3 text run 202). Two subcases exist for the DOWN possibility. The first subcase is that the text run 202 next in the reading order is in the line next to the current text box and spatially located below it. For example, assume that R1="propulsion systems." Then the text run R3 202="which are used to" comes next in the reading order.

The second subcase for the DOWN possibility is that the current text run R1 202 can be in the last line of the form, so that the next text run 202 is the top leftmost unexplored text run 202 in the form. For example, assume that the current text run R1 202="vessels or outboard". Then the text run R3 202="motors in Texas" comes next in the reading order.

While defining these two subcases, it is assumed that reading order never leaps over unexplored text runs 202 in the form. For example, when at the text run R1 202="vessels or outboard", the reading order must advance to text run R3 202="motors in". The reading cannot jump to the text run 202 "include the" leaping over unexplored text run R3 202.

The third possibility is that the reading order ends at the current text run 202 (i.e., both the text runs 202 in the "RIGHT" and the "DOWN" directions have different context). This is the EOS ("End of Statement") scenario. According to one embodiment of the present disclosure, when an EOS is predicted, the internal state of the model may be reset and parsing is restarted from the text run 202 that was found in the "DOWN" direction of the current text run R1 202. Following this procedure, these three possibilities suffice to deal with all the cases of detecting the reading order in a multi-part form when parsing of the text runs 202 occurs sequentially starting from the text run 202 in the top left corner of the form.

As another example, consider two sentences as A: "John is eating an apple." and B: "Henry is solving reading order problem." Then a possible training example could be:

["John is", "eating", "Henry is" ]
["an ap", "solving re", "ading" ]
["ple", "order" ]

According to this example, the guiding signal of the document 328 is:

["RIGHT", "DOWN", "DOWN" ]
["DOWN", "RIGHT", "DOWN" ]
["EOS", "EOS" ]

when document reading order processing system 320 processes the example sequentially.

Using the previous example of sentence A: "John is eating an apple" and sentence B: "Henry is solving reading order", these two sentences may be broken at random points to simulate the behavior of text runs detected through an OCR-like mechanism. For example, let A be broken as ["John is", "eating", "an app", "ple"] and B be broken as ["Henry is", "solving re", "ading", "order"]. To simulate the reading order problem, these two sentences may be arranged in a two-column format with A in the first column and B in the second column.

The techniques described in the present disclosure provide an end-to-end trained, deep learning solution for detecting the reading order in any form or document. The solution can be easily adapted to detect the reading order for any language. This can be achieved by training the new language model (using large amount of publically available language corpus), changing the possibilities considered at each text run 202 and order in which the next text runs 202 are considered on reaching an EOS ("End Of Statement").

The techniques described in the present disclosure can be generalized for detecting reading order in a general scanned document by increasing the number of possibilities for the reading order considered at each text run 202.

The character level language model trained in the first phase of the solution to output independent vector representations of text runs 202 can be used in a variety of applications where currently GloVe or Word2Vec are used to obtain vector representations of words.

Integration in Computing System and Network Environment

Figure 7A:
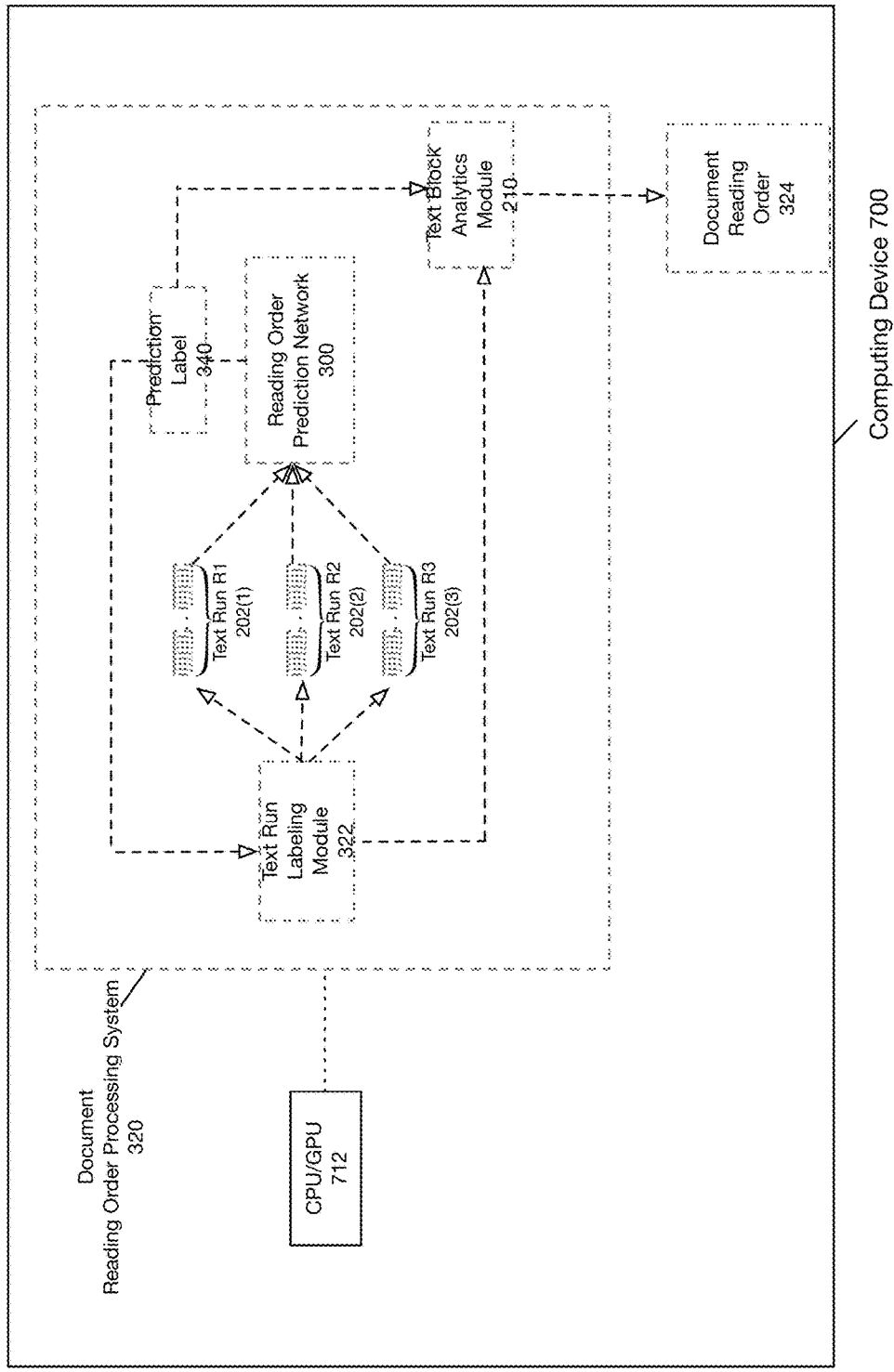
FIG. 7a illustrates an example computing system that executes an interactive voice editing system in accordance with embodiments of the present disclosure.

FIG. 7a illustrates an example computing system that executes an interactive voice editing system in accordance with embodiments of the present disclosure. As depicted in FIG. 7a, computing device 700 includes CPU/GPU 712 and document reading order processing system 320. Document reading order processing system 320 may be understood to be comprise programmatic structures for performing reading order processing and inference on a document 328. In particular, CPU/GPU 712 may be further configured via programmatic instructions to execute document reading order processing system 320 (as variously described herein). Other componentry and modules typical of a typical computing system, such as, for example a co-processor, a processing core, a graphics processing unit, a mouse, a touch pad, a touch screen, display, etc., are not shown but will be readily apparent. Numerous computing environment variations will be apparent in light of this disclosure. Computing device 700 may be any stand-alone computing platform, such as a desk top or work station computer, laptop computer, tablet computer, smart phone or personal digital assistant, game console, set-top box, or other suitable computing platform.

Figure 7B:
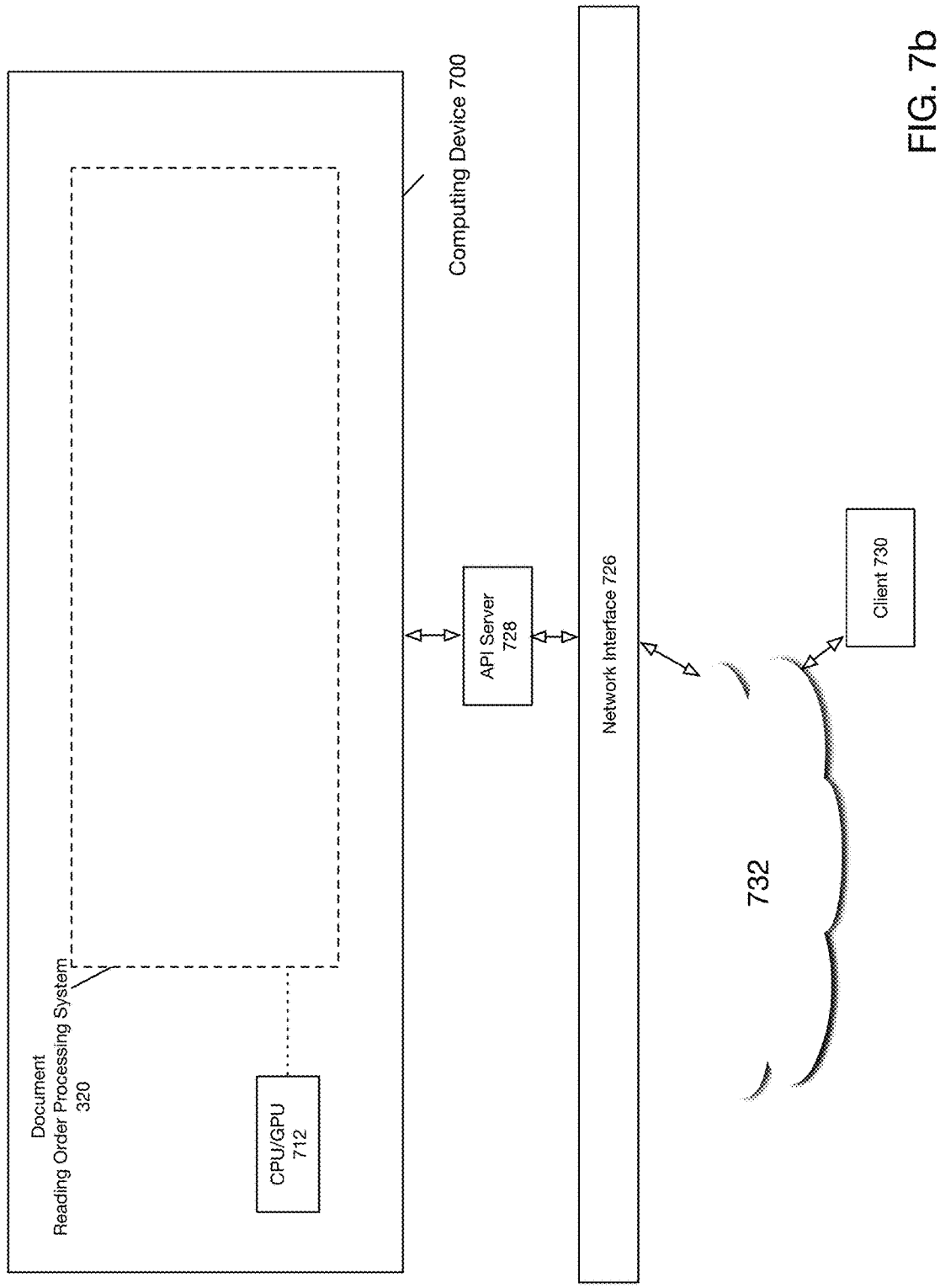
FIG. 7b illustrates an example integration of an interactive voice editing system into a network environment according to one embodiment of the present disclosure

FIG. 7b illustrates an example integration of an interactive voice editing system into a network environment according to one embodiment of the present disclosure. As depicted in FIG. 7b, computing device 700 may be collocated in a cloud environment, data center, local area network ("LAN") etc. Computing device 700 shown in FIG. 7b is structured identically to the example embodiment described with respect to FIG. 7a. In this instance, computing device 700 may be a server or server cluster, for example. As shown in FIG. 7b, client 730 interacts with computing device 700 via network 732. In particular, client 730 may make requests and receive responses via API calls received at API server 728, which are transmitted via network 732 and network interface 726.

It will be further readily understood that network 732 may comprise any type of public and/or private network including the Internet, LANs, WAN, or some combination of such networks. In this example case, computing device 700 is a server computer, and client 730 can be any typical personal computing platform As will be further appreciated, computing device 700, whether the one shown in FIG. 7a or 7b, includes and/or otherwise has access to one or more non-transitory computer-readable media or storage devices having encoded thereon one or more computer-executable instructions or software for implementing techniques as variously described in this disclosure. The storage devices may include any number of durable storage devices (e.g., any electronic, optical, and/or magnetic storage device, including RAM, ROM, Flash, USB drive, on-board CPU cache, hard-drive, server storage, magnetic tape, CD-ROM, or other physical computer readable storage media, for storing data and computer-readable instructions and/or software that implement various embodiments provided herein. Any combination of memories can be used, and the various storage components may be located in a single computing device or distributed across multiple computing devices. In addition, and as previously explained, the one or more storage devices may be provided separately or remotely from the one or more computing devices. Numerous configurations are possible.

In some example embodiments of the present disclosure, the various functional modules described herein and specifically training and/or testing of network 732, may be implemented in software, such as a set of instructions (e.g., HTML, XML, C, C++, object-oriented C, JavaScript, Java, BASIC, etc.) encoded on any non-transitory computer readable medium or computer program product (e.g., hard drive, server, disc, or other suitable non-transitory memory or set of memories), that when executed by one or more processors, cause the various creator recommendation methodologies provided herein to be carried out.

In still other embodiments, the techniques provided herein are implemented using software-based engines. In such embodiments, an engine is a functional unit including one or more processors programmed or otherwise configured with instructions encoding a creator recommendation process as variously provided herein. In this way, a software-based engine is a functional circuit.

In still other embodiments, the techniques provided herein are implemented with hardware circuits, such as gate level logic (FPGA) or a purpose-built semiconductor (e.g., application specific integrated circuit, or ASIC). Still other embodiments are implemented with a microcontroller having a processor, a number of input/output ports for receiving and outputting data, and a number of embedded routines by the processor for carrying out the functionality provided herein. In a more general sense, any suitable combination of hardware, software, and firmware can be used, as will be apparent. As used herein, a circuit is one or more physical components and is functional to carry out a task. For instance, a circuit may be one or more processors programmed or otherwise configured with a software module, or a logic-based hardware circuit that provides a set of outputs in response to a certain set of input stimuli. Numerous configurations will be apparent.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

Further Example Embodiments

The following examples pertain to further embodiments, from which numerous permutations and configurations will be apparent.

Example 1 is a method for determining reading order in a document, the method comprising processing a current text run through a first network to generate a first representation of said current text run, said first representation comprising a hidden state of a recurrent neural network ("RNN") trained using a stateful character level model, wherein said hidden state of said first network is not reset during a training process, processing a second text run to the right of said current text run and a third text run below said current text run through a respective second and third network to generate respective second and third representations, wherein said second and third representations comprise respective hidden states of an RNN trained using a stateless character level model, wherein said hidden states of said second and third network are periodically reset during a training process, concatenating said first, second and third representations to generate a concatenated representation, processing said concatenated representation through a classifier to generate a predicted next text run label, based upon said predicted next text run label, generating a text block, said text block comprising at least one text run in reading order sequence, and, updating said current text run based upon said predicted next text run label such that said current text run is one of a text run to the right of said current text run and a text run beneath said current text run.

Example 2 is the method of Example 1, wherein said second text run is associated with said text block if said classifier predicts the next text run is to the right of said current text run.

Example 3 is the method of Example 1, wherein said third text run is associated with said text block if said classifier predicts the next text run is below said current text run.

Example 4 is the method of Example 1, wherein said second and third networks are trained using a loss function based upon a predicted next character of said respective second and third networks and an actual next character in an input sequence.

Example 5 is the method of Example 4, wherein said first network is trained using a loss function based upon a predicted next character of said first network and an actual next character in an input sequence.

Example 6 is the method of Example 5, wherein said first network is trained using a loss function that calculates a loss based upon a comparison of a predicted next text character of said first network with an actual next character in an input sequence and a comparison of a prediction label for a next text run with an actual position of said next text run.

Example 7 is the method of Example 6, wherein said first network is trained using a truncated backpropagation in time algorithm.

Example 8 is a system for determining reading order in a document, the system comprising one or more processors, a text run labeling module at least one of executable or controllable by said one or more processors, wherein said text run labeling module assigns labels to received text runs as one of R1 (CURRENT), R2 (RIGHT), R3 (DOWN), a reading order prediction network further comprising a first LSTM ("Long Short Term Memory") network, a second LSTM network and a third LSTM network, at least one of executable or controllable by said one or more processors, wherein said reading order prediction network generates a prediction label based upon a labeled R1 text run, a labeled R2 text run, a labeled R3 text run as one of R2, R3, and EOS (End Of Statement) by processing a concatenated representation of hidden states of said first LSTM network trained using a stateful character level model and said second and third LSTM networks trained using a stateless character level model, and, a text block analytics module at least one of executable or controllable by said one or more processors, wherein said text block analytics module assigns a text run to a text block.

Example 9 is the system of Example 8, wherein said labeled R1 text run is provided as input to said first LSTM, said labeled R2 text run is provided as input to said second LSTM and said labeled R3 text run is provided to said third LSTM.

Example 10 is the system of Example 9, wherein each of said first, second and third LSTMs generates an internal representation (R1', R2', R3') based upon a respective input.

Example 11 is the system of Example 10, further comprising a classifier network, wherein said classifier network receives as input a concatenated representation of R1', R2' and R3.

Example 12 is the system of Example 11, wherein said classifier network generates a prediction label comprising one of R2, R3, and EOS respectively indicating a predicted next text run as to the right of a current text turn, down from said current text run and end of statement.

Example 13 is the system of Example 12, wherein said text block analytics module utilizes said prediction label to assign a text run to a text block.

Example 14 is the system of Example 8, wherein said received text runs are generated using an optical character recognition ("OCR") system.

Example 15 is a computer program product including one or more non-transitory machine-readable mediums encoded with instructions that when executed by one or more processors cause a process to be carried out for determining reading order in a document, said process comprising processing a first text run through a first network to generate a first representation of said text run, said first representation comprising a hidden state of a RNN trained using a stateful character level model, processing a second text run to the right of said first text run and a third text run below said first text run through a respective second and third network to generate respective second and third representations, wherein said second and third representations comprise respective hidden states of an RNN trained using a stateless character level model, concatenating said first, second and third representations to generate a concatenated representation, processing said concatenated representation through a classifier to generate a predicted next text run label, and, based upon said predicted next text run label, generating a text block, said text block comprising at least one text run in reading order sequence.

Example 16 is the computer program product of Example 15, wherein said second text run is associated with said text block if said classifier predicts the next text run is to the right of said current text run.

Example 17 is the computer program product of Example 15, wherein said third text run is associated with said text block if said classifier predicts the next text run is below said current text run.

Example 18 is the computer program product of Example 15, wherein said second and third networks are stateless networks and are trained using a loss function based upon a predicted next character of said respective second and third networks and an actual next character in an input sequence.

Example 19 is the computer program product of Example 18, wherein said first network is a stateful network.

Example 20 is the computer program product of Example 19, wherein said stateful network is trained using a loss function that calculates a loss based upon a comparison of a predicted next text character of said stateful network with an actual next character in an input sequence and a comparison of a prediction label for a next text run with an actual position of said next text run.

What is claimed is:

1. A method for determining reading order in a document, the method comprising:
    processing a current text run through a first network to generate a first representation of said current text run, said first representation comprising a hidden state of a recurrent neural network ("RNN") trained using a stateful character level model, wherein said hidden state of said first network is not reset during a training process;
    processing a second text run to the right of said current text run and a third text run below said current text run through a respective second and third network to generate respective second and third representations, wherein said second and third representations comprise respective hidden states of an RNN trained using a stateless character level model, wherein said hidden states of said second and third network are periodically reset during a training process;
    concatenating said first, second and third representations to generate a concatenated representation;
    processing said concatenated representation through a classifier to generate a predicted next text run label;
    based upon said predicted next text run label, generating a text block, said text block comprising at least one text run in reading order sequence; and,
    updating said current text run based upon said predicted next text run label such that said current text run is one of a text run to the right of said current text run and a text run beneath said current text run.

2. The method according to claim 1, wherein said second text run is associated with said text block if said classifier predicts the next text run is to the right of said current text run.

3. The method according to claim 1, wherein said third text run is associated with said text block if said classifier predicts the next text run is below said current text run.

4. The method according to claim 1, wherein said second and third networks are trained using a loss function based upon a predicted next character of said respective second and third networks and an actual next character in an input sequence.

5. The method according to claim 4, wherein said first network is trained using a loss function based upon a predicted next character of said first network and an actual next character in an input sequence.

6. The method according to claim 5, wherein said first network is trained using a loss function that calculates a loss based upon a comparison of a predicted next text character of said first network with an actual next character in an input sequence and a comparison of a prediction label for a next text run with an actual position of said next text run.

7. The method according to claim 6, wherein said first network is trained using a truncated backpropagation in time algorithm.

8. A system for determining reading order in a document, the system comprising:
    one or more processors;
    a text run labeling module at least one of executable or controllable by said one or more processors, wherein said text run labeling module assigns labels to received text runs as one of R1 (CURRENT), R2 (RIGHT), R3 (DOWN);
    a reading order prediction network further comprising a first LSTM ("Long Short Term Memory") network, a second LSTM network and a third LSTM network, at least one of executable or controllable by said one or more processors, wherein said reading order prediction network generates a prediction label based upon a labeled R1 text run, a labeled R2 text run, a labeled R3 text run as one of R2, R3, and EOS (End Of Statement) by processing a concatenated representation of hidden states of said first LSTM network trained using a stateful character level model and said second and third LSTM networks trained using a stateless character level model; and,
    a text block analytics module at least one of executable or controllable by said one or more processors, wherein said text block analytics module assigns a text run to a text block.

9. The system according to claim 8, wherein said labeled R1 text run is provided as input to said first LSTM, said labeled R2 text run is provided as input to said second LSTM and said labeled R3 text run is provided to said third LSTM.

10. The system according to claim 9, wherein each of said first, second and third LSTMs generates an internal representation (R1', R2', R3') based upon a respective input.

11. The system according to claim 10, further comprising a classifier network, wherein said classifier network receives as input a concatenated representation of R1', R2' and R3.

12. The system according to claim 11, wherein said classifier network generates a prediction label comprising one of R2, R3, and EOS respectively indicating a predicted next text run as to the right of a current text turn, down from said current text run and end of statement.

13. The system according to claim 12, wherein said text block analytics module utilizes said prediction label to assign a text run to a text block.

14. The system according to claim 8, wherein said received text runs are generated using an optical character recognition ("OCR") system.

15. A computer program product including one or more non-transitory machine-readable mediums encoded with instructions that when executed by one or more processors cause a process to be carried out for determining reading order in a document, said process comprising:
    processing a first text run through a first network to generate a first representation of said text run, said first representation comprising a hidden state of a RNN trained using a stateful character level model;
    processing a second text run to the right of said first text run and a third text run below said first text run through a respective second and third network to generate respective second and third representations, wherein said second and third representations comprise respective hidden states of an RNN trained using a stateless character level model;
concatenating said first, second and third representations to generate a concatenated representation;
processing said concatenated representation through a classifier to generate a predicted next text run label; and,
based upon said predicted next text run label, generating a text block, said text block comprising at least one text run in reading order sequence.

16. The computer program product according to claim 15, wherein said second text run is associated with said text block if said classifier predicts the next text run is to the right of said current text run.

17. The computer program product according to claim 15, wherein said third text run is associated with said text block if said classifier predicts the next text run is below said current text run.

18. The computer program product according to claim 15, wherein said second and third networks are stateless networks and are trained using a loss function based upon a predicted next character of said respective second and third networks and an actual next character in an input sequence.

19. The computer program product according to claim 18, wherein said first network is a stateful network.

20. The computer program product according to claim 19, wherein said stateful network is trained using a loss function that calculates a loss based upon a comparison of a predicted next text character of said stateful network with an actual next character in an input sequence and a comparison of a prediction label for a next text run with an actual position of said next text run.

\* \* \* \* \*

UNITED STATES PATENT AND TRADEMARK OFFICE
CERTIFICATE OF CORRECTION

| | |
|---|---|
| PATENT NO. | : 10,423,828 B2 |
| APPLICATION NO. | : 15/843953 |
| DATED | : September 24, 2019 |
| INVENTOR(S) | : Shagun Sodhani, Kartikay Garg and Balaji Krishnamurthy |

It is certified that error appears in the above-identified patent and that said Letters Patent is hereby corrected as shown below:

On the Title Page

Item (54) and in the Specification, Column 1 Lines 1-3 In the Title, please replace:
"USING DEEP LEARNING TECHNIQUES TO DETERMINE THE CONTEXTUAL READING ORDER IN A FORM DOCUMENT"

With:
--USING DEEP LEARNING TECHNIQUES TO DETERMINE THE CONTEXTUAL READING ORDER IN A DOCUMENT--

Signed and Sealed this
Eleventh Day of February, 2020

Andrei Iancu
*Director of the United States Patent and Trademark Office*